United States Patent
Hashimoto et al.

[11] Patent Number: 6,132,139
[45] Date of Patent: Oct. 17, 2000

[54] WATER LEVEL REGULATING DEVICE FOR PADDY FIELD

[75] Inventors: Taisuke Hashimoto; Kiminori Takao, both of Shiga; Tsuneo Onodera, Miyagi, all of Japan

[73] Assignees: Mitsubishi Plastics, Inc., Tokyo; Sekisui Chemical Co., Ltd., Osaka; Kabushiki Kaisha Paddy Kenkyusho, Miyagi, all of Japan

[21] Appl. No.: 09/147,200

[22] PCT Filed: Mar. 3, 1998

[86] PCT No.: PCT/JP98/00863
  § 371 Date: Nov. 2, 1998
  § 102(e) Date: Nov. 2, 1998

[87] PCT Pub. No.: WO98/38850
  PCT Pub. Date: Sep. 11, 1998

[30] Foreign Application Priority Data

| Mar. 3, 1997 | [JP] | Japan | 9-048206 |
| Jul. 4, 1997 | [JP] | Japan | 9-179199 |
| Jul. 4, 1997 | [JP] | Japan | 9-179204 |
| Jul. 4, 1997 | [JP] | Japan | 9-179386 |
| Feb. 26, 1998 | [JP] | Japan | 10-045274 |

[51] Int. Cl.[7] .................................................. A01G 25/00
[52] U.S. Cl. ............................... 405/104; 405/41; 405/36
[58] Field of Search ............................... 405/36, 37, 39, 405/40, 41, 104, 87

[56] References Cited

U.S. PATENT DOCUMENTS

| 2,077,307 | 4/1937 | Bumpas et al. | 405/36 |
| 2,820,479 | 1/1958 | Jenkins, Jr. | 405/39 |
| 3,803,851 | 4/1974 | Soileau | 405/40 |
| 3,894,398 | 7/1975 | Fritz et al. | 405/104 |

FOREIGN PATENT DOCUMENTS

| 7-284349 | 10/1995 | Japan . |  |
| 8-336336 | 12/1996 | Japan . |  |
| 9-47165 | 2/1997 | Japan . |  |
| 794112 | 1/1981 | U.S.S.R. | 405/41 |

*Primary Examiner*—Eileen D. Lillis
*Assistant Examiner*—Frederick L. Lagman
*Attorney, Agent, or Firm*—Armstrong, Westerman, Hattori, McLeland & Naughton

[57] ABSTRACT

A paddy field water level regulating device 6 installed between a water pipe buried along a farm road 43 and a farming plot 42, the device consisting of a cylindrical feed and drain basin 60 with a closed bottom, having a farming plot feed and drain port 61 communicating with the farming plot 42; a water inflow and drain section located in the geed and drain basin 60 near the bottom thereof and connected to the water pipe; a drain valve located in the water inflow and drain section; and a height-adjustable water level regulating weir 65 located in and water inflow and drain section.

25 Claims, 26 Drawing Sheets

WATER LEVEL REGULATING DEVICE FOR PADDY FIELD

TECHNICAL FIELD

The present invention relates to a paddy field water level regulating device, more specifically to a paddy field water level regulating device enabling not only easy regulation of the level of flooded water in each farming plot in a paddy field to a desired level with a minimum necessary amount of irrigation water but also easy supply and drainage of the water.

BACKGROUND ART

A conventional paddy field is of a structure as shown in the schematic plan view of FIG. 31. That is, water of a river 1 is introduced through a channel 21 to a trunk watering channel 30 and supplied to paddy fields 4. The paddy fields 4 are divided into a plurality of farming plots 42 by balks 41. Farm roads 40 run in the longitudinal direction of the paddy fields 4, and open watering channels 31 are formed along the edges of the farm roads 40 and along the farming plots 42. The upstream side of each watering channel 31 is connected to the trunk watering channel 30. The wall of each watering channel 31 locating on the farming plot 42 side is provided with distribution ports 32. The irrigation water in the watering channel 31 is supplied through the distribution ports 32 to the farming plots 42 respectively, as shown in the perspective view of FIG. 32.

Meanwhile, an open drainage channel 33 is formed along the space between adjacent paddy fields 4, i.e. on the other sides across the paddy fields 4 from the watering channels 31. Water level setting devices 34 are installed at drain ports of the drainage channels 33 facing the respective farming plots 42, so that fixed flooded water levels may be maintained in the farming plots 42 respectively by adjusting the height of each water level setting device 34. The drainage channel 33 is connected on the downstream side to a trunk drainage channel 35, and the surplus irrigation water or rainwater drained into the trunk drainage channel 35 is adapted to be returned through a channel 22 to the river 1.

In case of paddy fields having such a structure, the irrigation water of each watering channel 31 flows through the distribution ports 32 to the farming plots 42 successively from the upstream side to the downstream side. The irrigation water supplied to each farming plot 42 is maintained at a fixed level by the water level setting device 34, and surplus irrigation water is drained into the drainage channel 33. Since irrigation water is supplied to the farming plots 42 successively from the upstream side toward the downstream side, supply of irrigation water tends to be poorer toward the downstream farming plots 42. Particularly, during the drought season, irrigation water is not substantially supplied to the downstream farming plots 42, causing reduction in the yield of rice plant due to insufficient growth.

Further, the conventional paddy fields where the channels are of open type involve a problem in that the farm cannot be utilized effectively, since the spaces for farming plots 42 and farm roads 40 are reduced by the widths occupied by the watering channels 31 and the drainage channel 33. Further, earth, sand, etc. are likely to fall into the open-top channels to deposit there, so that they must be removed frequently, requiring intricate care of the channels.

Meanwhile, as the number of farming families with side jobs increases with urbanization of agricultural villages, there are increasing demands on automation and energy saving in the farming work and the like, in turn, on labor saving in irrigation control of paddy fields, fertilization control, etc. due to reduction and limitation of the farming time.

A first objective of the present invention is to provide a paddy field water level regulating device which can supply irrigation water stably throughout paddy fields and can automatically maintain fixed flooded water levels in the paddy fields.

A second objective of the present invention is to provide a paddy field water level regulating device which enjoys excellent installability and can be provided inexpensively.

A third objective of the present invention is to provide a paddy field water level regulating device which can easily cope with changing crop production in some farming plots.

DISCLOSURE OF THE INVENTION

A first aspect of the present invention is a paddy field water level regulating device installed between a water pipe buried along a farm road and a farming plot, the device consisting of a cylindrical feed and drain basin with a closed bottom, having a farming plot feed and drain port communicating with the farming plot; a water inflow and drain section located in the feed and drain basin near the bottom thereof and connected to the water pipe; a drain valve located in the water inflow and drain section; and a height-adjustable water level regulating weir located in the water inflow and drain section.

The water inflow and drain section may be connected to the water pipe via a feed and drain valve.

A second aspect of the present invention is a paddy field water level regulating device installed between a group of pipes, including a watering pipe and a drain pipe which are buried along a farm road, and a farming plot, the device consisting of a cylindrical feed and drain basin with a closed bottom, having a farming plot feed and drain port communicating with the farming plot; a water inflow section located in the feed and drain basin near the bottom thereof and connected to the watering pipe; a feed valve for controlling supply of irrigation water located in the water inflow section; a height-adjustable check weir located in the water inflow section; a water drain section located in the feed and drain basin near the bottom thereof and connected to the drain pipe; a drain valve located in the water drain section; and a height-adjustable water level regulating weir located in the water drain section.

A third aspect of the present invention is a paddy field water level regulating device installed between a group of pipes, including a watering pipe and a water level regulating pipe which are buried along a farm road, and a farming plot, the device consisting of a cylindrical feed and drain basin with a closed bottom, having a farming plot feed and drain port communicating with the farming plot; a water inflow section located in the feed and drain basin near the bottom thereof and connected to the watering pipe; a feed valve for controlling supply of irrigation water located in the water inflow section; a height-adjustable check weir located in the water inflow section; a water level regulating basin connected to the water level regulating pipe; a regulating water inflow section located in the water level regulating basin near the bottom thereof and connected to the upstream side of the water level regulating pipe; a regulating water outflow section located in the water level regulating basin near the bottom thereof and connected to the downstream side of the water level regulating pipe; a drain valve located in the regulating water outflow section; a height-adjustable water level regulating weir located in the regulating water outflow section; and a regulating water communicating section for allowing the feed and drain basin and the water level regulating basin to communicate with each other via regulating water blocking means.

A fourth aspect of the present invention is a paddy field water level regulating device installed between a group of pipes, including a watering pipe, a drain pipe and a water level regulating pipe which are buried along a farm road, and a farming plot, the device consisting of a cylindrical feed and drain basin with a closed bottom, having a farming plot feed and drain port communicating with the farming plot; a water inflow section located in the feed and drain basin near the bottom thereof and connected to the watering pipe; a feed valve for controlling supply of irrigation water located in the water inflow section; a water drain section located in the feed and drain basin near the bottom thereof and connected to the drain pipe; a drain valve located in the water drain section; a height-adjustable drainage regulating weir located in the water drain section; a water level regulating basin connected to the water level regulating pipe; a regulating water inflow section located in the water level regulating basin near the bottom thereof and connected to the upstream side of the water level regulating pipe; a regulating water outflow section located in the water level regulating basin near the bottom thereof and connected to the downstream side of the water level regulating pipe; a height-adjustable water level regulating weir located in the regulating water outflow section; and a regulating water communicating section for allowing the feed and drain basin and the water level regulating basin to communicate with each other via regulating water blocking means.

The water inflow section may have a height-adjustable check weir. A fifth aspect of the present invention is a paddy field water level regulating device installed between a watering pipe buried along a farm road and a farming plot, the device consisting of a cylindrical feed and drain basin with a closed bottom, having a farming plot feed and drain port communicating with the farming plot; a water inflow section located in the feed and drain basin near the bottom thereof and connected to the upstream side of the watering pipe; a water outflow section located in the feed and drain basin near the bottom thereof and connected to the downstream side of the watering pipe; a drain valve located in the water outflow section; and a height-adjustable water level regulating weir located, in the water outflow section.

Typical examples in these aspects of the invention will be described below. The farming plot feed and drain port communicates with the farming plot via a height adjustable overflow gate. The water level regulating weir, the check weir and the drainage regulating weir each consist of a pipe having an upper end opening and a cylinder fitted in the pipe to be movable vertically. The feed and drain basin is provided with a drain pipe opening down into the ground under the farming plot via blocking means which can be opened and closed. The feed and drain basin and the water level regulating basin are juxtaposed integrally via a partition containing the regulating water communicating section. The check weir consists of a large-diameter cylinder having an upper end opening and a lower end opening, a branch cylinder branching horizontally out of the large-diameter cylinder and penetrating the wall of the feed and drain basin to communicate with the farming plot, and a small-diameter cylinder slidably fitted in the large-diameter cylinder.

According to the paddy field water level regulating device of the present invention, since water pipes (watering pipes, drain pipes and water level regulating pipes) are buried along farm roads formed along the edges of paddy fields, the spaces for farming plots, farm roads, etc. can be increased greatly, enabling effective utilization of the farm.

Further, supply of irrigation water to farming plots, maintenance of flooded water level, draining of irrigation water from the farming plots, etc. can securely be carried out using the water level regulating devices with easy operation, enabling efficient control of irrigation water including maintenance of flooded water level in each farming plot. Further, this device can cope with cutback on rice acreage and the like in some farming plots. Besides, these functions are integrated in one feed and drain basin, so that the water level regulating device can be made compact, enjoys excellent installability and can be provided inexpensively.

Furthermore, according to the present invention, control of irrigation water can be carried out so as to minimize the portion of the irrigation water supplied to each farming plot and is drained as surplus water, the amounts of agricultural chemicals, fertilizers, etc. applied to each farming plot and flowing out together with the irrigation water can be reduced, eliminating the fear of environmental disruption.

In addition, in the present invention, the water level regulating device requires no water feeding means like pumps which are necessary in the conventional flat farm irrigation, and necessary flow rates can be secured without sloping the pipes steeply. Accordingly, pipe-laying work can be carried out simply and easily, leading to reduction in the construction cost on a great margin.

BEST MODE FOR CARRYING OUT THE INVENTION

Embodiments of the water level regulating device according to the present invention will be described below specifically referring to the attached drawings. It should be noted here that in the following embodiments, the same and like elements are affixed with the same reference numbers respectively, and detailed description relating with them will be omitted so as to avoid redundancy.

The water level regulating device according to a first embodiment of the present invention will be described specifically referring to FIGS. 1 to 5.

Figure 1:
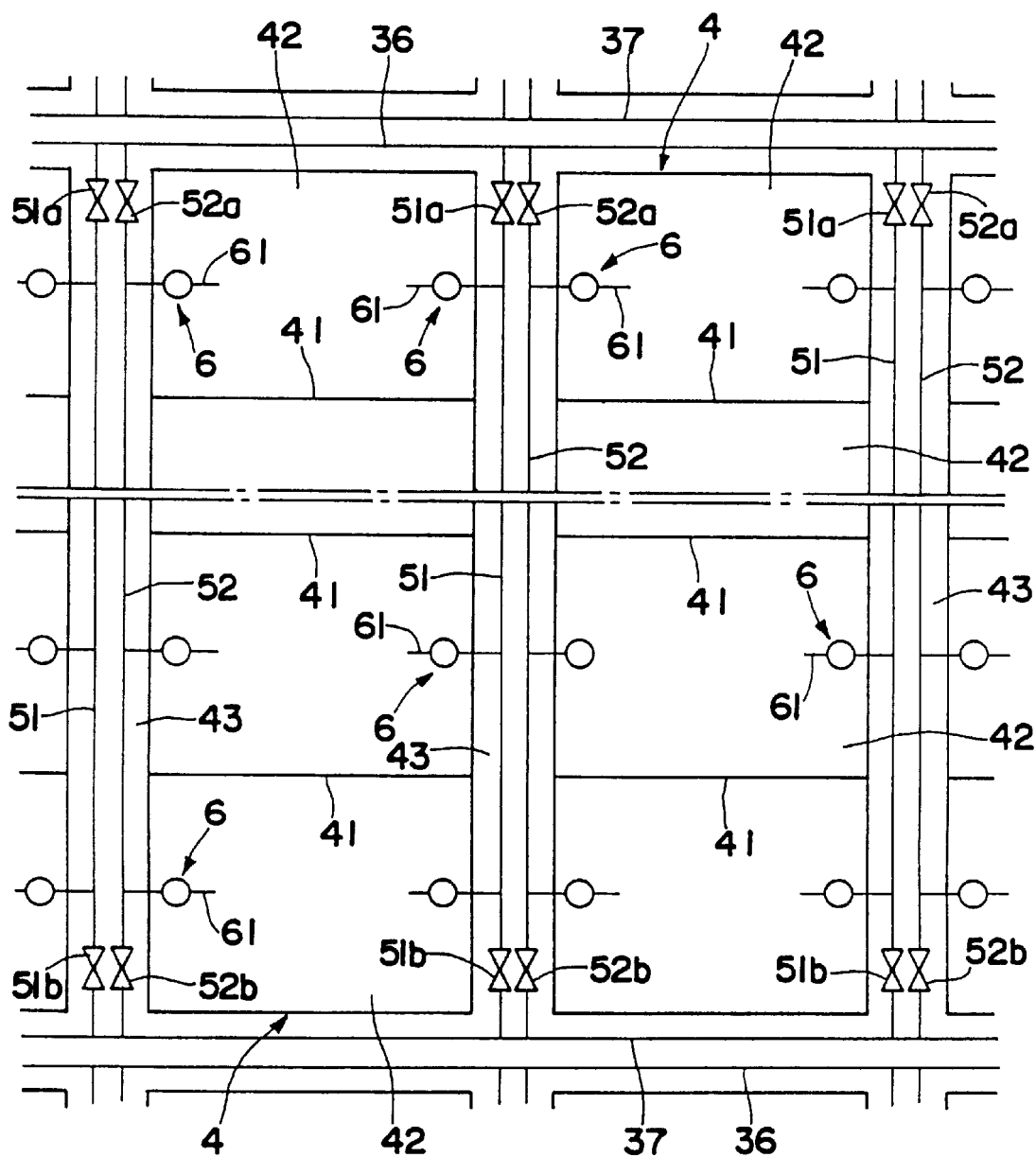
FIG. 1 is a schematic plan view showing an irrigation water control system employing water level regulating devices according to a first embodiment of the present invention.

FIG. 1 is a schematic plan view showing an example of irrigation water control system employing the water level regulating devices. Paddy fields 4 are each divided into a plurality of farming plots 42 by a plurality of balks 41 running orthogonal to the longitudinal direction of the paddy fields. Each farming plot 42 is a rectangular section having long sides of ca. 100 to 200 m and short sides of ca. 30 to 100 m and is leveled substantially, although it may be sloped gently as a whole.

Further, farm roads 43 run along the longitudinal side edges of each paddy field 4. Each farm road 43 is designed to have a flat surface, along the central zone, having substantially the same dimensions as in the conventional farm roads, and the flat surface has a beveled face or faces on one side or on each side sloping down toward the paddy fields 4. These beveled faces are formed by removing irrigation channels and drainage channels having been present along the farm roads and filling the gaps thus formed. Accordingly, the farm roads 43 are much wider than the conventional farm roads so that an agrimotor and the like can turn and change direction, and that the farm road 43 on one side may be utilized as a parking space.

In each farm road 43 are buried at lower positions of the beveled face a watering pipe 51 and a drain pipe 52 which are generally referred to as water pipes through which irrigation water flows. The watering pipe 51 and the drain pipe 52 are connected on the upstream sides to an irrigation line 36 via valves 51a and 52a and on the downstream sides to a drainage line 37 via valves 51b and 52b, respectively. The irrigation line 36 and the drainage line 37 may be of open channels or pipelines depending on the situation. A channel (not shown) for introducing water from a river is connected to the irrigation line 36, whereas another channel for returning drained irrigation water and rainwater to the river is connected to the drainage line 37.

Further, water level regulating devices 6 are installed between the watering pipe 51 and each farming plot 42 and between the drain pipe 52 and each farming plot 42. A pair of water level regulating devices 6 are installed per each farming plot 42: one of which locating on the water supply side is connected to the watering pipe 51, while the other device 6 locating on the water drainage side is connected to the drain pipe 52.

Figure 2:
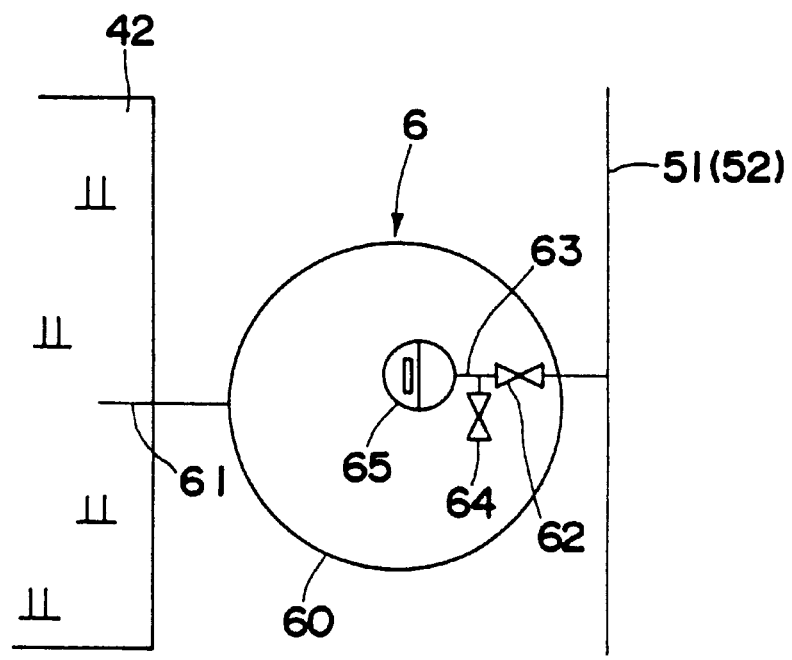
FIG. 2 is a schematic illustration of piping showing the water level regulating device of the first embodiment.
Figure 3:
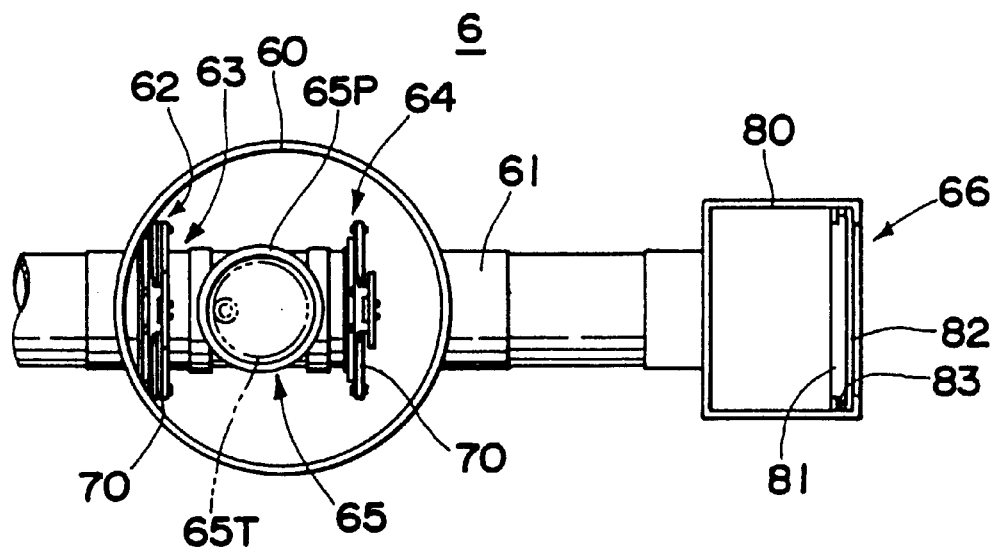
FIG. 3 is a plan view showing a typical configuration of the water level regulating device.
Figure 4:
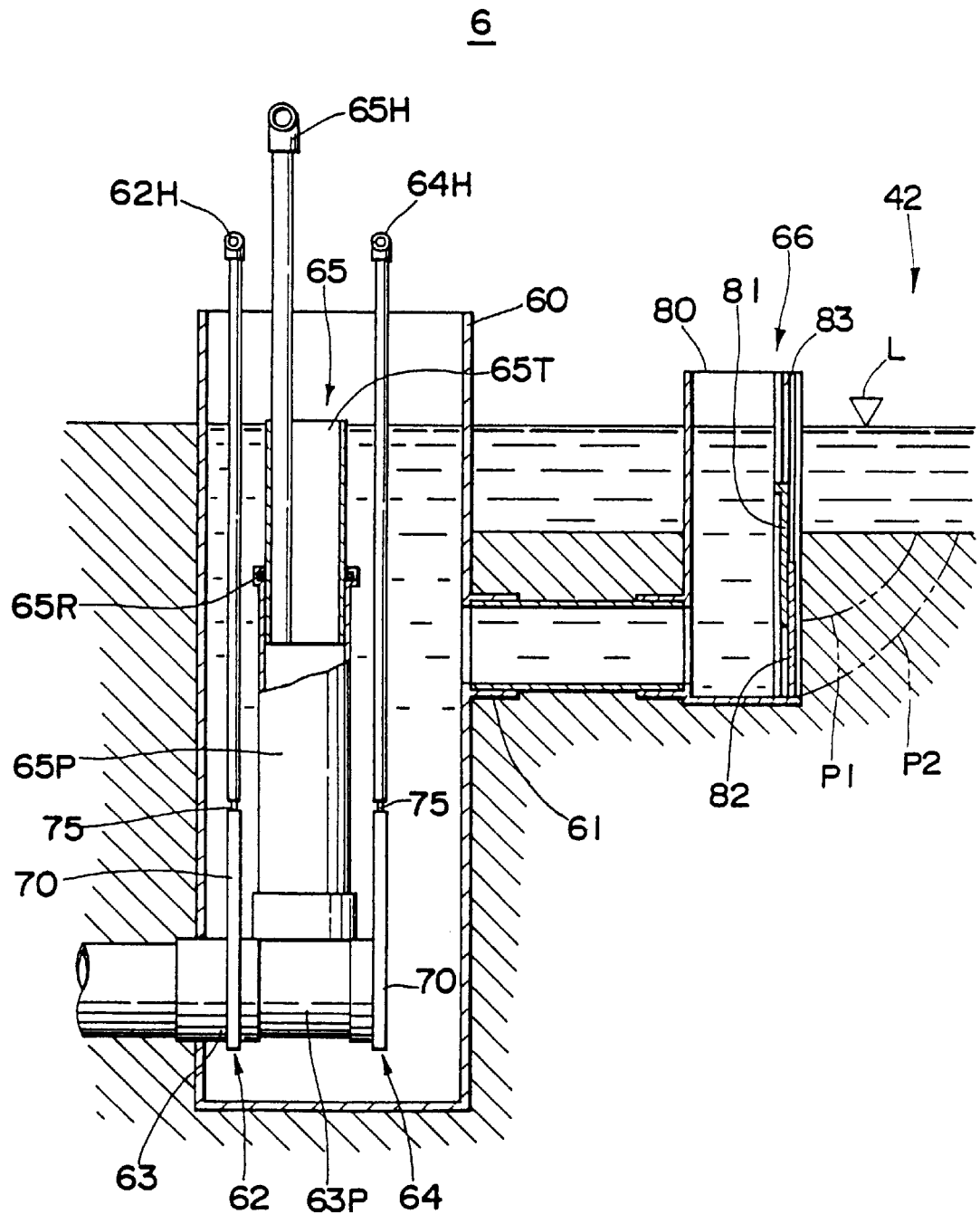
FIG. 4 is a vertical cross-sectional view of the water level regulating device.

FIGS. 2 to 4 show an example of water level regulating device 6 employed for control of irrigation water in a farming plot 42: FIG. 2 is a schematic illustration of piping; FIG. 3 is a plan view; and FIG. 4 is a vertical cross-sectional view.

This water level regulating device 6 contains a cylindrical feed and drain basin 60 with a closed bottom, having a farming plot feed and drain port 61 (for feeding irrigation water to and draining it from a farming plot) communicating with the farming plot 42; a water inflow and drain section 63 located in the feed and drain basin 60 near the bottom thereof and connected via a feed and drain valve 62 to the watering pipe 51 (or the drain pipe 52); a drain valve 64 located in the water inflow and drain section 63; and a height-adjustable open-top water level regulating weir 65 located in the water inflow and drain section 63. A height-adjustable and removable overflow gate 66 is located at the farming plot feed and drain port 61.

The water level regulating weir 65 consists of a pipe 65P having an upper end opening and erecting perpendicular from a horizontal pipe 63P locating between the feed and drain valve 62 and the drain valve 64 in the water inflow and drain section 63; and a cylinder 65T fitted in the pipe 65P to be movable vertically via a rubber seal packing 65R for providing water tightness and sliding resistance. This cylinder 65T has an operating rod 65H extending upward beyond the upper opening of the feed and drain basin 60. The cylinder 65T is ascended and descended using this operating rod 65H. If the upper edge of this cylinder 65T is expanded to form a bell mouth, irrigation water can be drained efficiently.

Figure 5:
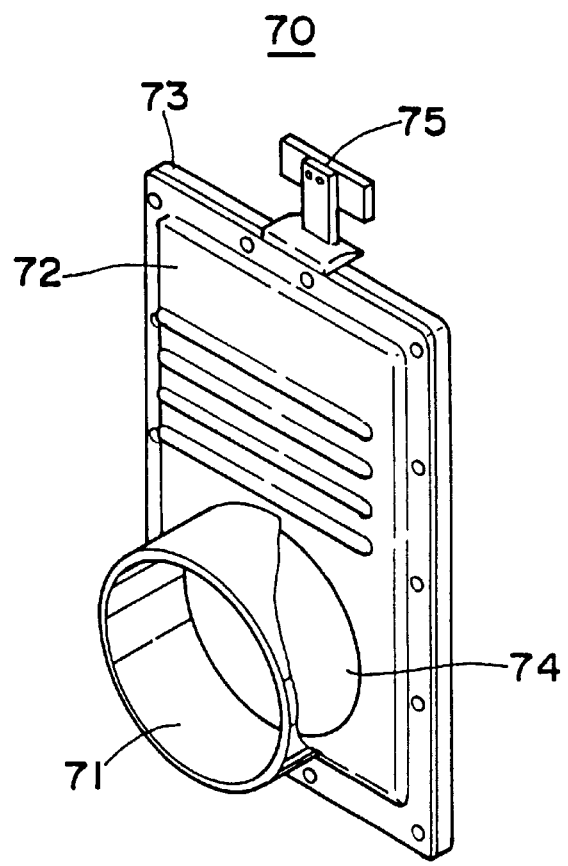
FIG. 5 is a perspective view of a slide valve employed in the water level regulating device.

As shown in the perspective view of FIG. 5, slide valves 70 employed as the feed and drain valve 62 and the drain valve 64 each consist of a pair of plate members 72 and 73 having through holes 71 respectively to be in alignment with the pipe 63P of the water inflow and drain section 63, a plate-like valve element 74 interposed between these plate members 72 and 73 to be movable vertically and a valve stem 75 attached to the valve element 74, which is operated so as to open and close the valve element 74. The valve stems 75 of the feed and drain valve 62 and of the drain valve 64 are respectively provided with operating rods 62H and 64H like the operating rod 65H.

The operating rods 62H, 64H and 65H may be calibrated so as to indicate the open/closed state etc. of the valves. Further, a lid may be applied to the top of the feed and drain basin 60.

The overflow gate 66 located at the farming plot feed and drain port 61 consists of a pair of weir plates (an upper plate and a lower plate) 81 and 82 disposed in an outlet basin 80 having an opening on the farming plot 42 side and applied to this opening. These weir plates 81 and 82 are inserted to a pair of grooves 83 formed on each side of the basin 80 to be adjustable in their positions vertically and to be removable so as to prevent earth and sand from being carried into the feed and drain basin 60 or to accelerate drainage of water from the farming plot 42 by adjusting the positions of the weir plates 81 and 82 in the vertical direction or removing them.

The water level regulating devices 6 having the constitution described above are buried along the beveled faces of the farm roads 43 facing the farming plots 42 respectively to be perpendicular to the flooded water level, and the flooded water level is set for each farming plot 42. Although a block of paddy field 4 is leveled such that the farming plots 42 therein may be on the same plane, there may be small differences in the levels of the farming plots 42 depending on the topography. Accordingly, the height of the water level regulating weir 65 in each water level regulating device 6 installed in each farming plot 42 is set for each farming plot 42 by operating the operating rod 65H to ascend or descend the cylinder 65T.

Generally, in the water level regulating devices 6 installed in each farming plot 42, the water level regulating weir 65 in the water level regulating device 6 connected to the watering pipe 51 is set such that the upper edge of the cylinder 65T may be located slightly higher than the flooded water level L, while the water level regulating device 6 connected to the drain pipe 52 is set such that the upper edge of the cylinder 65T may be at the flooded water level L. Further, the feed and drain valve 62 in the water level regulating device 6 of the watering pipe 51 is opened appropriately, while the feed and drain valve 62 in the water level regulating device 6 of the drain pipe 52 is opened fully, and the drain valves 64 in both of these water level regulating devices 6 are closed fully. Further, the overflow gate 66 is set at a height lower than the flooded water level L and higher than the ground surface.

Under this setting state, in the water level regulating device 6 of the watering pipe 51, the irrigation water fed from the watering pipe 51 flows through the feed and drain valve 62 having a predetermined open position, and through the water inflow and drain section 63 and the pipe 63P and then ascends through the pipe 65P to flow over the upper edge of the cylinder 65T of the water level regulating weir 65 into the feed and drain basin 60. The irrigation water then flows through the farming plot feed and drain port 61 and over the overflow gate 66 to be supplied to the farming plot 42. In this process, since the upper edge of the cylinder 65T is set at a position slightly higher than the flooded water level L, the irrigation water does not flow back to the watering pipe 51 even if supply of irrigation water to the watering pipe 51 is stopped. Further, since the overflow gate 66 is set at a position higher than the ground surface, the earth and sand in the farming plot 42 are not carried into the feed and drain basin 60.

Meanwhile, in the water level regulating device 6 of the drain pipe 52, since the upper edge of the cylinder 65T of the water level regulating weir 65 is adjusted to a height corresponding to the flooded water level L, the surplus irrigation water supplied to the farming plot 42 or rainwater flows over the overflow gate 66 and through the farming plot feed and drain port 61 into the feed and drain basin 60. The water then flows over the upper edge of the cylinder 65T and down through the pipe 65P and is drained through the water inflow and drain section 63 into the drain pipe 52.

Accordingly, the flooded water level in each farming plot 42 can be regulated automatically by adjusting the height of the cylinder 65T of the water level regulating weir 65 in the water level regulating device 6 of the drain pipe 52 to a predetermined level. Inflow of irrigation water into each farming plot 42 can be regulated by adjusting suitably the valve position of the feed and drain valve 62 in the water level regulating device 6 of the watering pipe 51, and thus a fixed flooded water level L can be maintained with a minimum necessary amount of irrigation water.

Since the amount of irrigation water to be supplied to each farming plot 42 can be reduced by carrying out control of irrigation water as described above, irrigation water can be distributed evenly throughout farming plots 42 from the upstream side to the downstream side, avoiding lack of water from occurring in the downstream farming plots 42. Further, since inflow of irrigation water into the farming plot 42 can be reduced, agricultural chemicals, fertilizers, etc. applied to the farming plot 42 are prevented from flowing out, eliminating the fear of environmental disruption.

Meanwhile, when irrigation water is drained from the farming plot 42, the feed and drain valve 62 in the water level regulating device 6 of the watering pipe 51 is closed, and the cylinder 65T of the water level regulating weir 65 in the water level regulating device 6 of the drain pipe 52 is pushed down or the drain valve 64 is opened. Thus, the irrigation water held in the farming plot 42 can be drained through the water level regulating device 6 to the drain pipe 52.

Further, if the drain valve 64 locating at the bottom of the feed and drain basin 60 is opened, the earth, sand, etc. carried from the farming plot 42 and the like through the farming plot feed and drain port 61 into the feed and drain basin 60 can be discharged through the drain valve 64 together with the irrigation water into the drain pipe 52.

Meanwhile, in puddling of paddy fields which requires a large amount of irrigation water at one time, the cylinder 65T of the water level regulating weir 65 in the water level regulating device 6 of the drain pipe 52 is pulled up, or the feed and drain valve 62 is closed. Thus, the irrigation water fed from the watering pipe 51 flows through the water level regulating device 6 of the watering pipe 51 into the farming plot 42 and is held entirely therein without being drained through the water level regulating device 6 of the drain pipe 52 to reach quickly a predetermined water level.

In the case where some farming plots 42 need not be irrigated due to cutback on rice acreage or other reasons, the feed and drain valves 62 in the water level regulating devices 6 of the watering pipe 51 in the relevant farming plots 42 are closed, while the feed and drain valves 62 in the water level regulating devices 6 of the drain pipe 52 are opened fully, and the weir plates 81 and 82 of the overflow gates 66 are removed. Thus, the rainwater or the like in the farming plots 42 is drained therefrom through the water level regulating devices 6 of the drain pipe 52 into the drain pipe 52.

Since the amount of irrigation water flowing through the watering pipe 51 can be reduced according to the water level regulating device 6 having such a constitution, a small-diameter pipe can be employed as the watering pipe 51. Further, some degrees of flow rate can be secured in the pipes 51 and 52 without sloping them steeply, so that the procedures of installing water level regulating devices 6 in each farming plot 42 can be facilitated. Besides, the water level regulating device 6 can be integrated into the feed and drain basin 60 by suitably combining synthetic resin cylinders and the like. Accordingly, the water inflow and drain section 63 and the farming plot feed and drain port 61 may merely be connected directly or via suitable joints to the watering pipe 51 or the drain pipe 52 and to the overflow gate 66, leading to reduction in the installation cost etc. on a great margin. In addition, the water level regulating device 6 requires no pumps which are necessary for force-feeding irrigation water in the conventional flat farm irrigation, and irrigation water can be fed under very low pressure.

Further, earth, sand, etc. can be prevented from being carried into the feed and drain basin 60 during puddling by employing as the overflow gate 66 a pair of sliding weir plates 81 and 82, i.e. an upper plate and a lower plate, and also midseason drainage and drainage for changing crop production can be carried out effectively. More specifically, if the upper weir plate 81 is pulled up, earth, sand, etc. are prevented from being carried into the feed and drain basin 60 during puddling. Meanwhile, when the paddy field is subjected to midseason drainage, water can be drained by pushing down 'the upper weir plate 81 and digging down the ground around it as indicated by P1 in FIG. 4. Further, in cutback on rice acreage or in changing crop production, drainage of irrigation water from the paddy field can be carried out smoothly by pulling up or removing the upper and lower weir plates 81 and 82 and digging down the ground around it by about 30 cm as indicated by P2 in FIG. 4, advantageously.

In puddling, cutback on rice acreage or changing crop production, the valves 51a, 51b, 52a and 52b located at each end of the watering pipe 51 and of the drain pipe 52 are opened and closed respectively to carry out these draining operations efficiently. In the normal state, the valve 51a and the valve 51b of the watering pipe 51 are set open and closed respectively, while the valves 52a and 52b of the drain pipe 52 are set closed and open respectively. Accordingly, the irrigation water of the irrigation line 36 is designed to flow through the valve 51a into the watering pipe 51 and pass through the water level regulating device 6 of the watering pipe 51 to be supplied to the farming plot 42, while the surplus irrigation water or the like in the farming plot 42 is designed to flow through the water level regulating device 6 of the pipe 52 into the drain pipe 52 to be drained through the valve 52b into the drainage line 37.

In puddling, the valves 51a and 51b of the watering pipe 51 are left as such, and the valve 52a on the irrigation line 36 side of the drain pipe 52 is opened, and the valve 52b on the drainage line 37 side is closed. Thus, the drain pipe 52 can be utilized for supplying irrigation water. More specifically, the irrigation water of the irrigation line 36 flows through the valves 51a into the watering pipe 51 and also flows through the valve 52a into the drain pipe 52. Since the valves 51b and 52b on drainage line 37 side in the pipes 51 and 52 are closed, the irrigation water is entirely supplied to the farming plots 42 through the water level regulating devices 6 disposed to these pipes 51 and 52, respectively, thus enabling filling of the farming plots 42 with the irrigation water to a predetermined level in a short time.

Meanwhile, in cutback on rice acreage or changing crop production, the valves 52a and 52b of the drain pipe 52 are left as such, while the valve 51a on the irrigation line 36 side of the watering pipe 51 is closed and the valve 51b on the drainage line 37 side is opened. Thus, the watering pipe 51 can be utilized for drainage. More specifically, the irrigation water of the irrigation line 36 does not flow into the pipes 51 and 52, since the valves 51a and 52a are closed, but the irrigation water or rainwater in the farming plot 42 passes through the drain valves 64 in the water level regulating devices 6 disposed to the pipes 51 and 52 respectively to flow into the watering pipe 51 and drain pipe 52 respectively, and to be drained therefrom into the drainage line 37. Thus, not only the water in the farming plots 42 can be drained in a short time, but also drainage of huge amount of rainwater caused by localized torrential downpour, long rain, etc. can be carried out smoothly.

Figure 6:
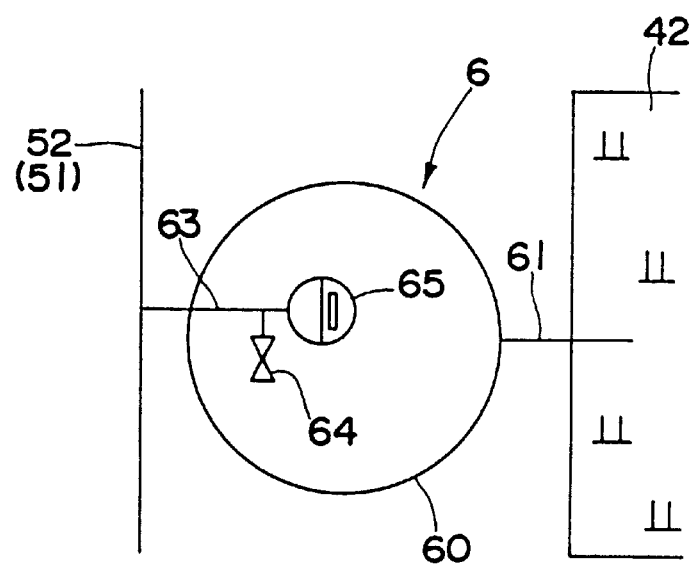
FIG. 6 is a schematic illustration of piping showing a variation of the water level regulating device.
Figure 7:
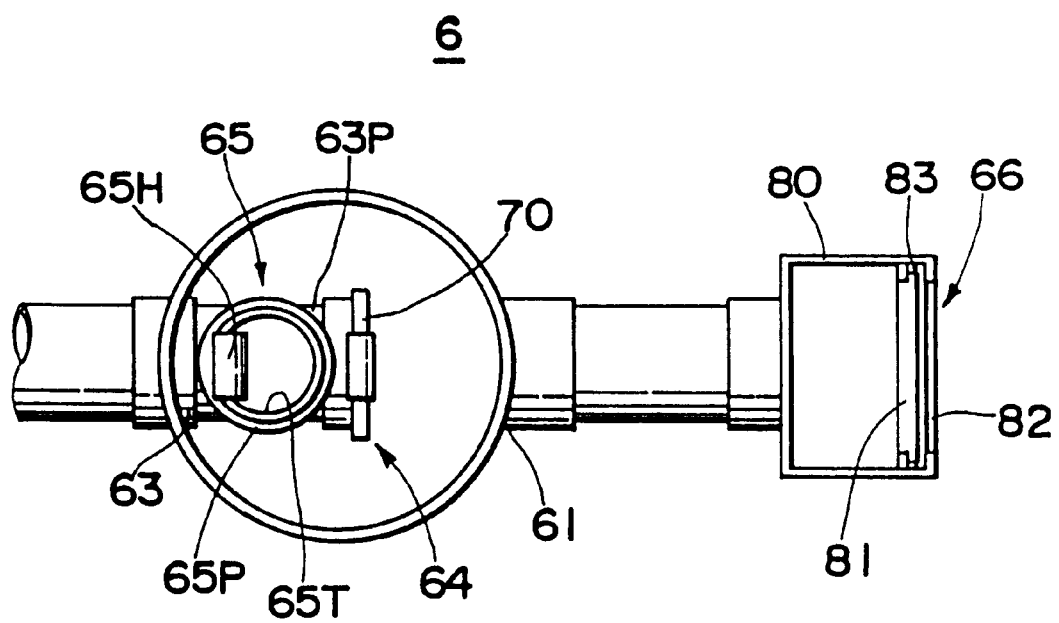
FIG. 7 is a plan view of the water level regulating device according to the variation.
Figure 8:
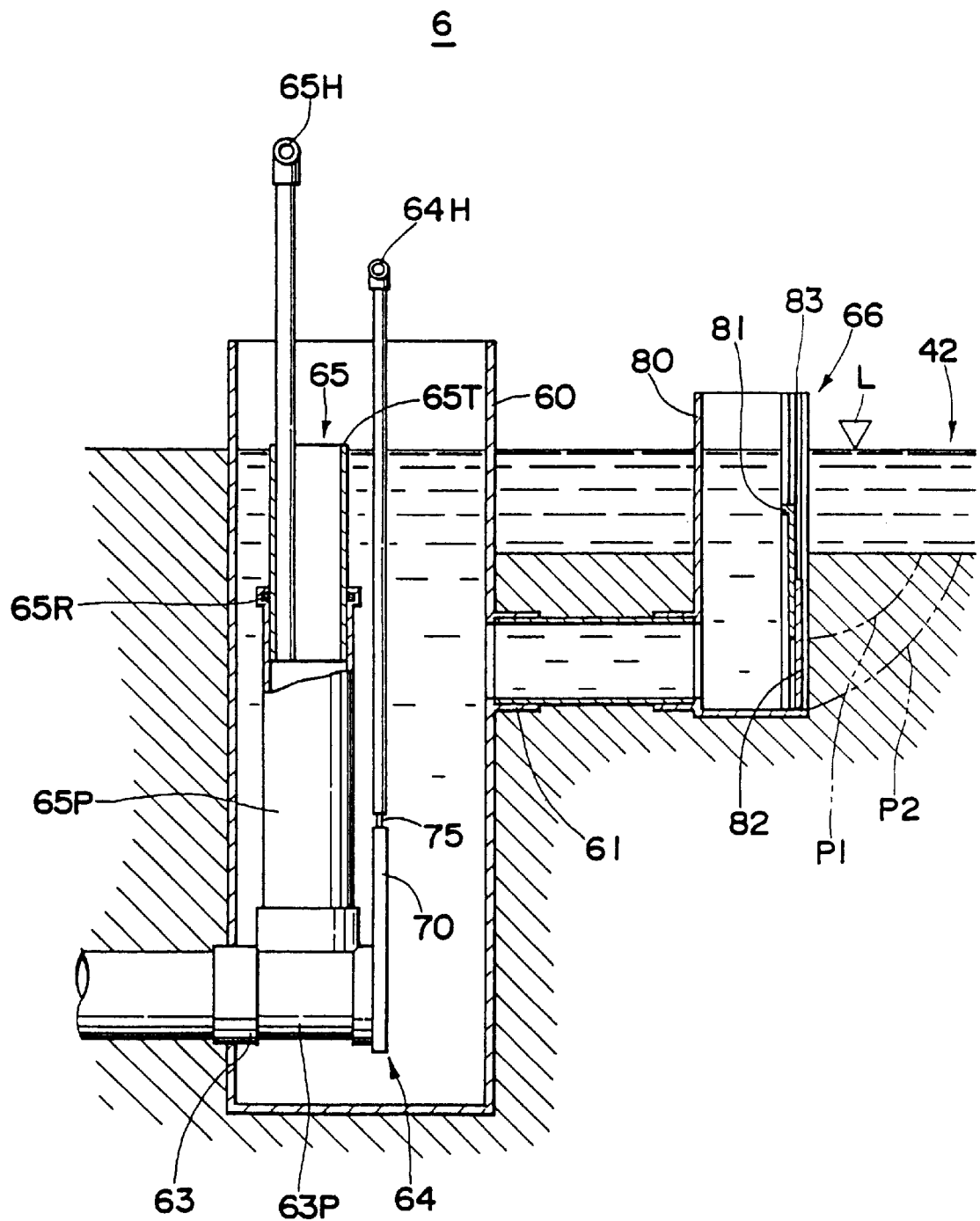
FIG. 8 is a vertical cross-sectional view of the water level regulating device according to the variation.

FIGS. 6 to 8 show a variation of the water level regulating device of the first embodiment: FIG. 6 is a schematic illustration of piping; FIG. 7 is a plan view; and FIG. 8 is a vertical cross-sectional view. In the water level regulating device 6 of the variation, the feed and drain valve 62 of the water inflow and drain section 63 in the water level regulating device 6 shown in the foregoing embodiment is omitted, and the feed and drain basin 60 having the farming plot feed and drain port 61 communicating with the farming plot 42 contains likewise a water inflow and drain section 63 connected to the drain pipe 52 (or to the watering pipe 51), and the water inflow and drain section 63 is provided with a drain valve 64 and a water level regulating weir 65. It should be noted here that, referring to other constituents, those which are the same as in the water level regulating device 6 of the first embodiment are affixed with the same reference numbers respectively, and detailed description of them will be omitted. Since operations of adjusting the water level and draining irrigation water are the same as described above, description of the action of the water level regulating device 6 of the variation will also be omitted.

As described above, since the feed and drain valve 62 in the water level regulating device 6 connected to the drain pipe 52 is normally set full open in normal service, production cost of the water level regulating device can be reduced if the device 6 of the variation free from the feed and drain valve is connected to the drain pipe 52, leading to reduction in the cost of the entire system. Further, this water level regulating device 6 can be connected to the watering pipe 51 if a suitable valve is attached to an external piping of the water inflow and drain section 63.

Incidentally, while the feed and drain basins constituting the water level regulating devices illustrated in the above two examples are of cylindrical shape, the shape of these basins may not particularly be limited and may be of rectangular body. Further, the structure of the water level regulating weirs may not be limited to the cylinders but may be bellows or weir plates. Further, the operating rods may be designed to be removable employing, for example, a screw structure, and thus the water level regulating weirs and the like are prevented from being operated unnecessarily.

While a pair of water level regulating devices, one for feeding and the other for draining, are installed on each side of each farming plot in FIG. 1, respectively, both of the water level regulating device for feeding and that for draining may be installed on one side of each farming plot. It is also possible to install three or more water level regulating devices depending on the acreage of the farming plot or the capacity of the device.

Further, opening and closing of the valves and adjustment of the position of the overflow weir in the vertical direction may be designed to be controlled remotely using a motor and the like in place of the operating rods or controlled automatically using a computer and the like.

The water level regulating device according to a second embodiment of the present invention will be described specifically referring to FIGS. 9 to 13.

Figure 9:
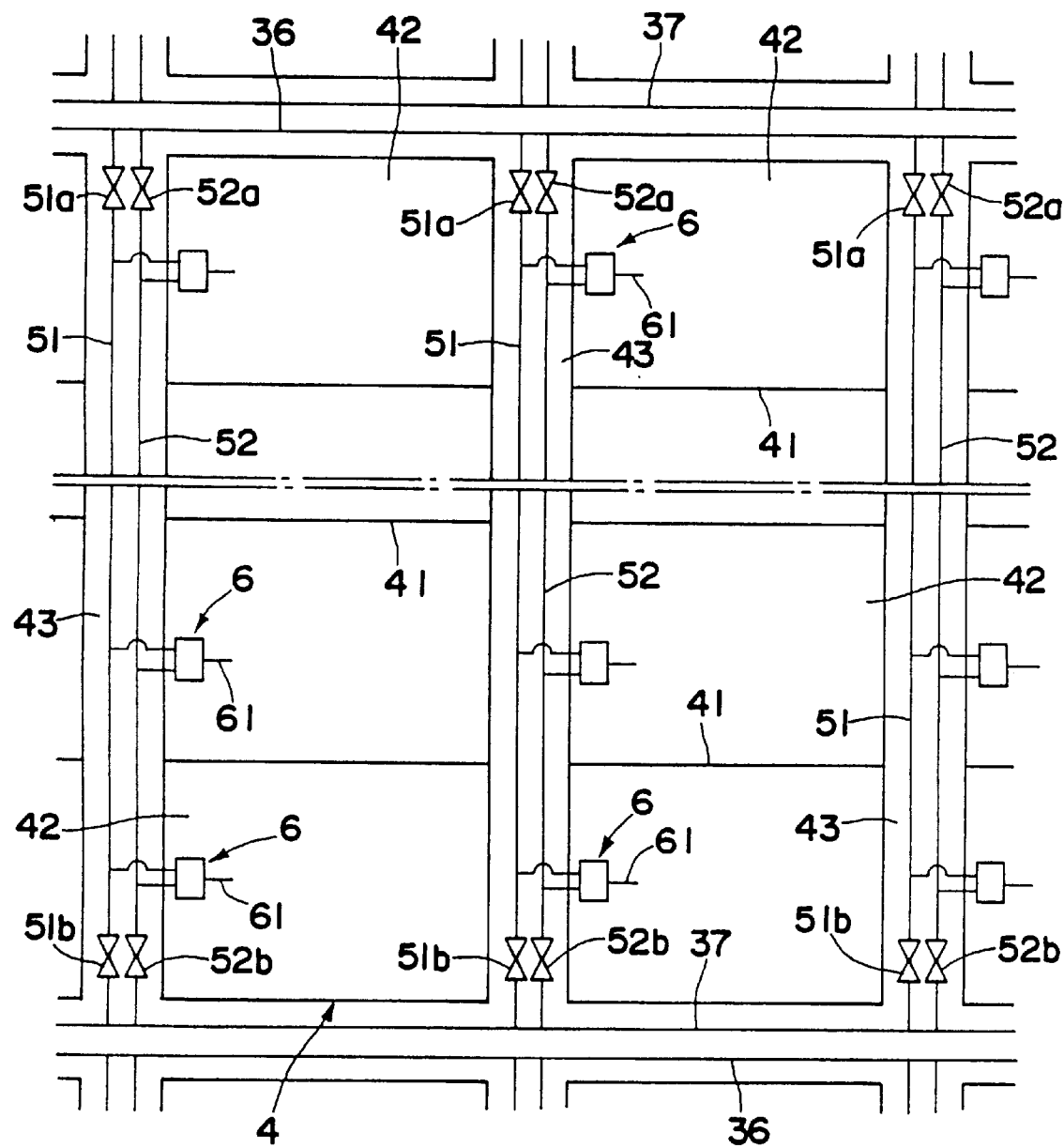
FIG. 9 is a schematic plan view showing an example of irrigation water control system employing water level regulating devices according to a second embodiment of the present invention.
Figure 10:
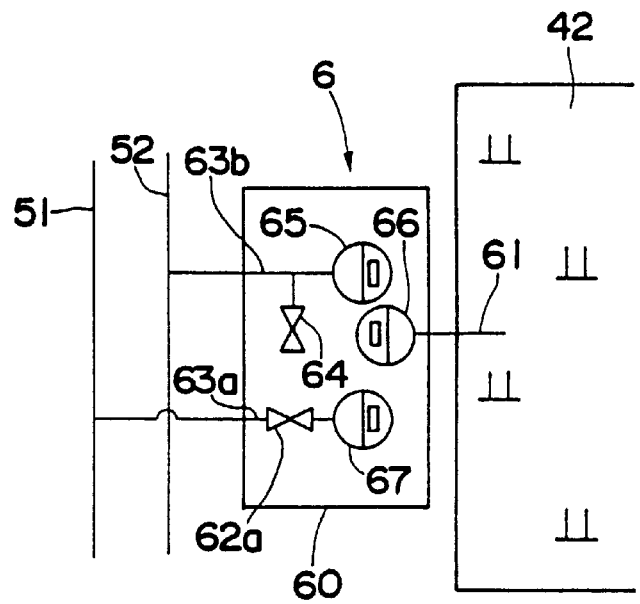
FIG. 10 is a schematic illustration of piping showing the water level regulating device of the second embodiment.
Figure 11:
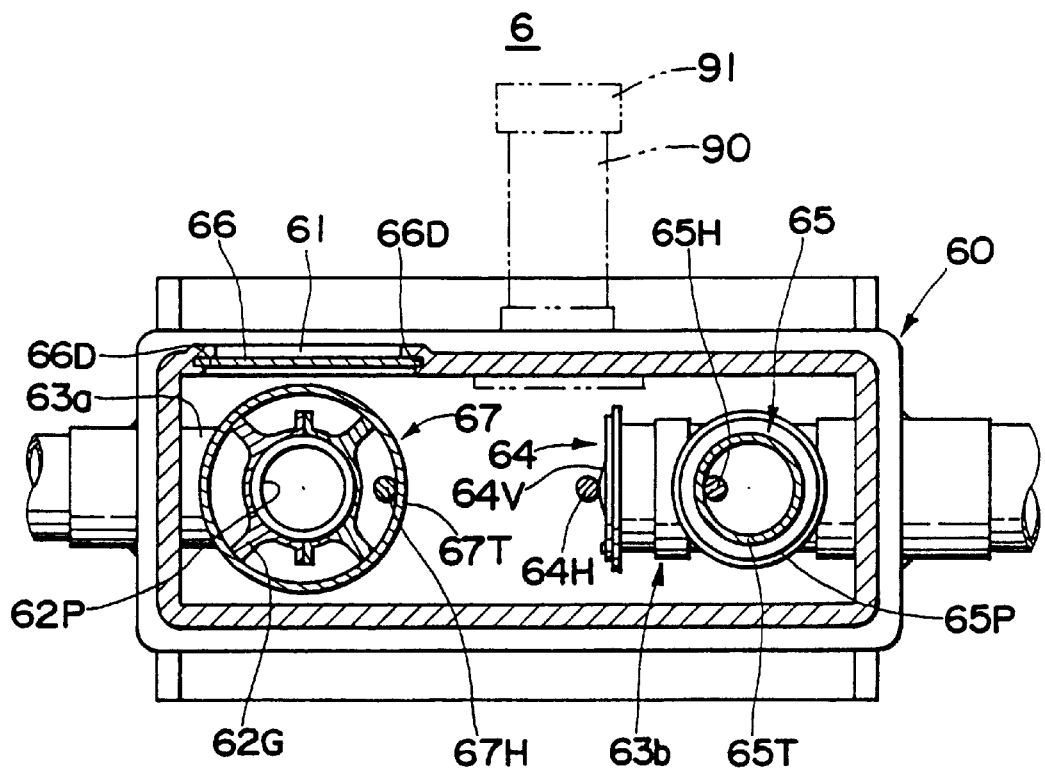
FIG. 11 is a plan view showing a typical configuration of the water level regulating device.
Figure 12:
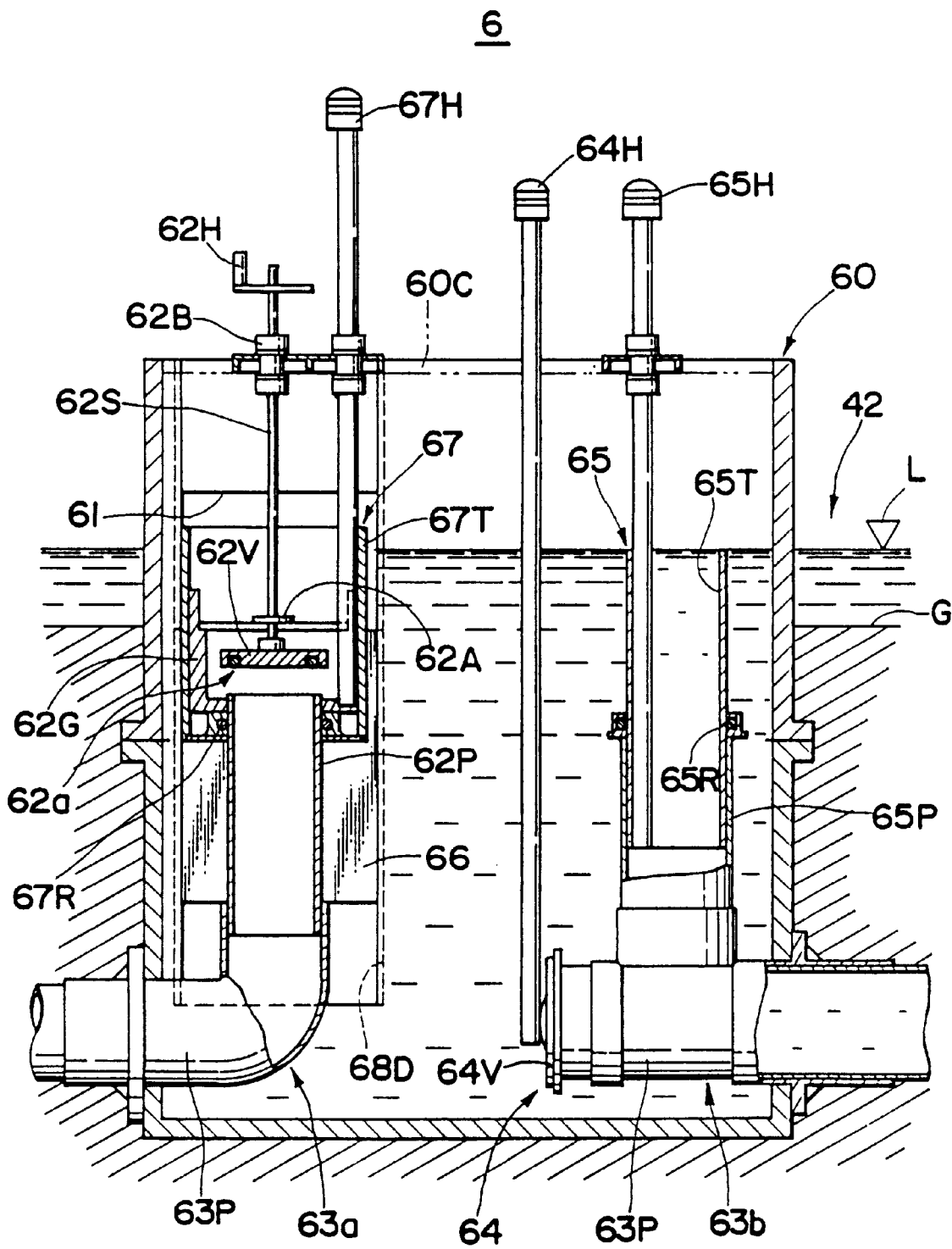
FIG. 12 is a vertical cross-sectional view of the water level regulating device shown in FIG. 11.
Figure 13:
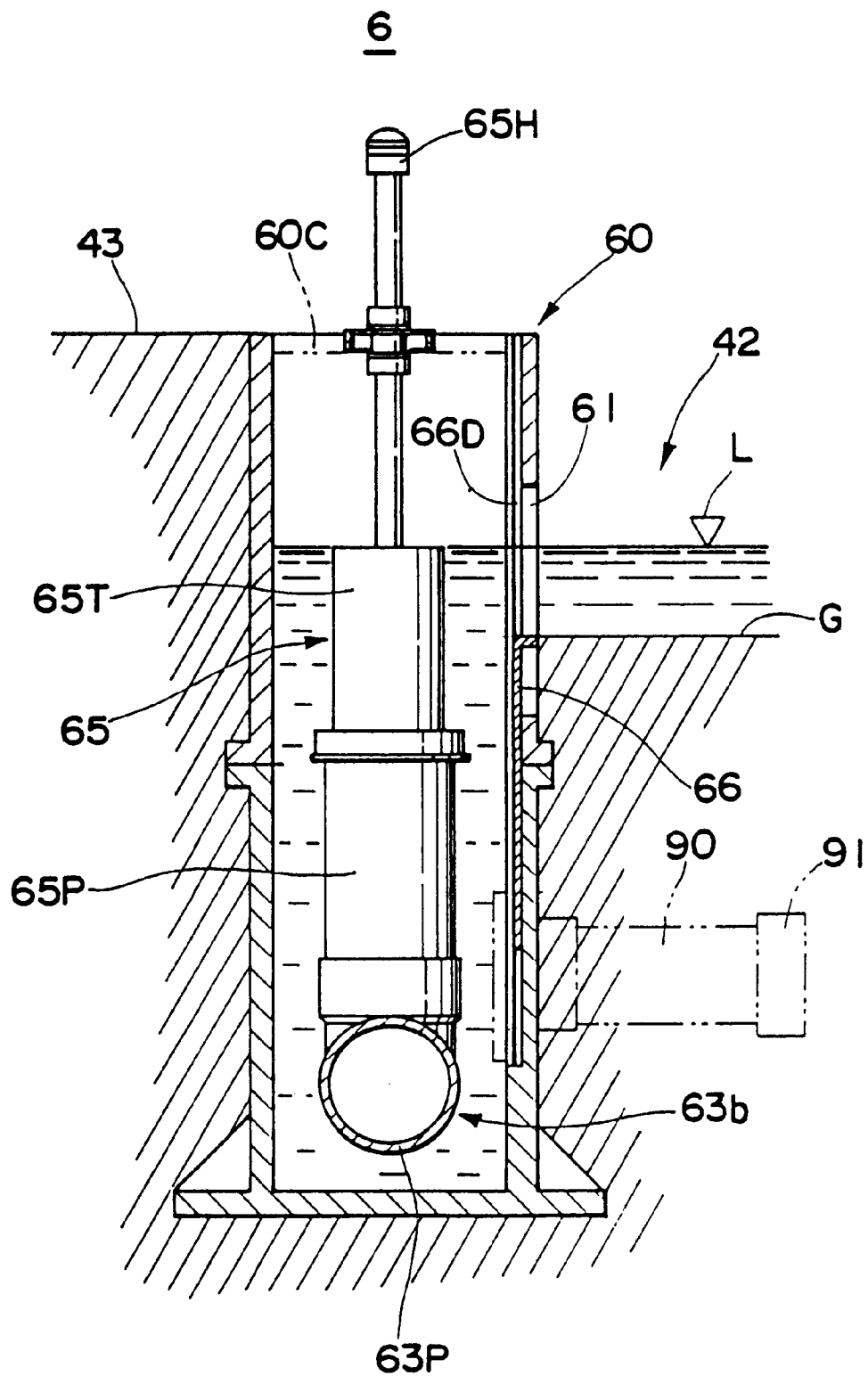
FIG. 13 is a vertical cross-sectional view showing a water drainage section and a farming plot feed and drain port.

FIG. 9 is a schematic plan view showing an example of irrigation water control system employing water level regulating devices; FIG. 10 is a schematic illustration of piping showing the water level regulating device; FIG. 11 is a plan view; FIG. 12 is a vertical cross-sectional view; and FIG. 13 is a vertical cross-sectional view showing a water drainage section and a farming plot feed and drain port.

The water level regulating device 6 of this embodiment is installed between a group of pipes, including a watering pipe 51 and a drain pipe 52) and each farming plot 42 to supply the irrigation water fed from the watering pipe 51 to the farming plots 42 and to drain the surplus water in the farming plot 42 to the drain pipe 52 respectively.

This water level regulating device 6 contains a rectangular feed and drain basin 60 with a closed bottom, having a farming plot feed and drain port 61 communicating with the farming plot 42; a water inflow section 63a located in the feed and drain basin 60 near the bottom thereof and connected to the watering pipe 51; a feed valve 62a controlling supply of water located in the water inflow section 63a; a height-adjustable open-top check weir 67 located in the water inflow section 63a; a water drain section 63b located in the basin 60 near the bottom thereof and connected to the drain pipe 52; a drain valve 64 located in the water drain section 63b; and a height-adjustable open-top water level regulating weir 65 located in the water drain section 63b. A height-adjustable overflow gate 66 is located at the farming plot feed and drain port 61.

The feed valve 62a opens and closes with a disc valve element 62V thereof the upper opening of a vertical pipe 62P connected to a pipe 63P of the water inflow section 63a. The valve element 62V is provided with an operating handle 62H via a screw valve stem 62S penetrating a bearing 62A supported by a guide member 62G attached to the top of the pipe 62P and a bearing 62B locating at the top of the feed and drain basin 60. Opening and closing of the feed valve 62a and the valve position thereof are controlled by turning the operating handle 62H to move the screw valve stem 62S vertically relative to the female screw of the bearing 62B.

Meanwhile, the check weir 67 consists of a large-diameter cylinder 67T having at the lower end a rubber seal packing 67R which is applied on the outer circumference of the pipe 62P so as to provide water tightness and appropriate sliding resistance. This cylinder 67T is designed to be moved vertically being guided by the seal packing 67R and the guide member 62G and to be retained at a desired height. The cylinder 67T is provided with an operating rod 67H extending upward beyond the upper opening of the feed and drain basin 60.

The water level regulating weir 65 consists of a cylinder 65T which is fitted likewise to the upper end opening of a pipe 65P erecting perpendicular from the horizontal pipe 63P of the water drain section 63b via a rubber seal packing 65R to be movable vertically. This cylinder 65T also has a like operating rod 65H as described above. If the upper edge of this cylinder 65T is expanded to form a bell mouth, irrigation water can be drained efficiently.

As the drain valve 64, there is employed, for example, a ferrule type valve which opens and closes a pipe end opening, and a valve element 64V attached to the open end of the pipe 63P is designed to be opened and closed with a like operating rod 64H as described above.

The farming plot feed and drain port 61 is opening down to a position lower than the field surface G, and the overflow gate 66 located at the farming plot feed and drain port 61 is fitted in guide grooves 66D formed on each side of the port 61 to be movable vertically. Usually, the overflow gate 66 is set such that the upper edge thereof and the field surface G may be on the same plane or the former may be slightly higher than the latter, thus preventing earth and sand from being carried into the feed and drain basin 60. If the ground in front of the farming plot feed and drain port 61 is dug down and the overflow gate 66 is pushed down, drainage from the farming plot 42 can be accelerated.

Incidentally, the operating handle 62H and the operating rods 64H, 65H and 67H may be calibrated so as to indicate the open/closed state etc. of the valves. Further, a lid 60C may be applied to the top of the feed and drain basin 60 as depicted by imaginary lines in FIGS. 12 and 13. If the lid 60C which is to be applied is made of a transparent material, the state in the feed and drain basin 60 can easily be confirmed.

The water level regulating devices 6 having the constitution described above are buried along the beveled faces of the farm roads 43 facing the farming plots 42 respectively, and the flooded water level L is set for each farming plot 42. In other words, the height of the water level regulating weir 65 in each water level regulating device 6 installed in each farming plot 42 is set for each farming plot 42 by ascending or descending the operating rod 65H attached to the cylinder 65T.

Generally, in the water level regulating device 6 installed in each farming plot 42, the check weir 67 of the water inflow section 63a connected to the watering pipe 51 is set such that the upper edge of the cylinder 67T may be located slightly higher than the flooded water level L, while the water level regulating weir 65 of the water drain section 63b connected to the drain pipe 52 is set such that the upper edge of the cylinder 65T may be at the flooded water level L. Further, the feed valve 62a and the drain valve 64 are opened appropriately and closed fully respectively, and the overflow gate 66 is set at a height lower than the flooded water level L and as high as or higher than the ground surface (field surface G).

Under this setting state, the irrigation water fed from the watering pipe 51 flows through the feed valve 62a assuming a predetermined open position and the water inflow section 63a and ascends through the pipe 63P to flow over the upper edge of the cylinder 67T of the check weir 67 into the feed and drain basin 60. The irrigation water then flows through the farming plot feed and drain port 61 and over the overflow gate 66 to be supplied to the farming plot 42. This feeding of irrigation water to the farming plot 42 is continued until the flooded water level L increases to reach a height exceeding the upper edge of the cylinder 65T of the water level regulating weir 65.

Meanwhile, the surplus irrigation water supplied to the farming plot 42 or rainwater flows back through the farming plot feed and drain port 61 into the feed and drain basin 60 and then flows over the upper edge of the cylinder 65T of the water level regulating weir 65 adjusted to the height corresponding to the flooded water level L and down through the pipe 65P to be drained through the water drain section 63b into the drain pipe 52.

In this process, since the upper edge of the cylinder 67T of the check weir 67 is set at a position slightly higher than the flooded water level L, the irrigation water does not flow back to the watering pipe 51 even if supply of irrigation water to the watering pipe 51 is stopped. Further, the earth and sand in the farming plot 42 are prevented from being carried into the feed and drain basin 60 by setting suitably the position of the overflow gate 66.

Accordingly, the flooded water level in each farming plot 42 can be regulated automatically by adjusting the height of the cylinder 65T of the water level regulating weir 65 of the water drain section 63b to a predetermined level. In addition, inflow of irrigation water to the farming plot 42 can be regulated by adjusting suitably the valve position of the feed valve 62a of the water inflow section 63a, and a fixed flooded water level L can be maintained with a minimum necessary amount of irrigation water.

Since the amount of irrigation water to be supplied to the farming plot 42 can be reduced by carrying out control of irrigation water as described above, irrigation water can be distributed evenly throughout the farming plots 42 from the upstream side to the downstream side, avoiding lack of water from occurring in the downstream farming plots 42. Further, in the state where a fixed flooded water level L is maintained in the farming plot 42, the irrigation water in the farming plot 42 is not substantially discharged to the outside, so that agricultural chemicals, fertilizers, etc. applied to the farming plot 42 scarcely flow out together with the irrigation water or rainwater, eliminating the fear of environmental disruption.

Meanwhile, when irrigation water is drained from the farming plot 42, the feed valve 62a is closed, and the cylinder 65T of the water level regulating weir 65 is pushed down or the drain valve 64 is opened. Thus, the irrigation water held in the farming plot 42 can be drained through the water drain section 63b to the drain pipe 52.

Further, if the drain valve 64 locating at the bottom of the feed and drain basin 60 is opened, the earth, sand, etc. carried from the farming plot 42 and the like through the farming plot feed and drain port 61 into the feed and drain basin 60 can be discharged through the drain valve 64 together with the irrigation water into the drain pipe 52.

Meanwhile, in puddling of paddy fields which requires a large amount of irrigation water at one time, the feed valve 62a is opened fully, and the cylinder 67T of the check weir 67 is pushed down, while the cylinder 65T of the water level regulating weir 65 is pulled up. Thus, the irrigation water fed from the watering pipe 51 flows through the water inflow section 63a into the farming plot 42 and is entirely supplied into the farming plot 42 to be held therein without being drained through the water drain section 63b to reach quickly a predetermined water level. By repeating these procedures for each farming plot 42, irrigation water can be supplied throughout the farming plots 42 from the upstream side to the downstream side successively.

Further, in the case where some farming plots 42 need not be irrigated due to cutback on rice acreage or other reasons, the feed valves 62a of the water level regulating devices 6 of the relevant farming plots 42 are closed, and the cylinders 65T of the water level regulating weirs 65 are pushed down, or the drain valves 64 are opened fully, while the overflow gates 66 are pushed down. Thus, the rainwater or the like in the farming plots 42 is drained therefrom through the water level regulating devices 6 into the drain pipe 52.

As depicted by imaginary lines in FIGS. 11 and 13, the feed and drain basin 60 may be provided with a drain pipe 90 opening down into the ground under the farming plot. This drain pipe 90 is normally-closed with blocking means such as a cap 91. When some farming plots 42 are used for changing crop production etc., the ground around the drain pipe 90 is dug down, and the cap 91 of the pipe 90 is taken off, while the feed valve 62a and the drain valve 64 are closed and opened respectively. Thus, rainwater and the like can be drained promptly from the relevant farming plots 42, so that water is prevented from dwelling therein, enabling utilization of these farming plots 42 as dry fields.

Incidentally, the structure of the check weir and that of the water level regulating weir may not be limited to the cylinders but may be bellows or weir plates. Further, the valve structures may be suitably selected. In addition, the operating rods may be designed to be removable employing, for example, a screw structure, and thus the water level regulating weir and the like are prevented from being operated unnecessarily.

While the second embodiment is of the case where one water level regulating device is installed per each farming plot, the present invention is not limited to this constitution. In other words, if water level regulating devices are installed on each side of each farming plot, delicate control of irrigation water can be carried out over the entire farming plots, and a desired number of water level regulating devices can be installed depending on the acreage, configuration, etc. of farming plots. In the case where a plurality of water level regulating devices are to be installed, some of them may be used for feeding only and the others for drainage only.

A water level regulating device according to a third embodiment of the present invention will be described specifically referring to FIGS. 14 to 18.

Figure 14:
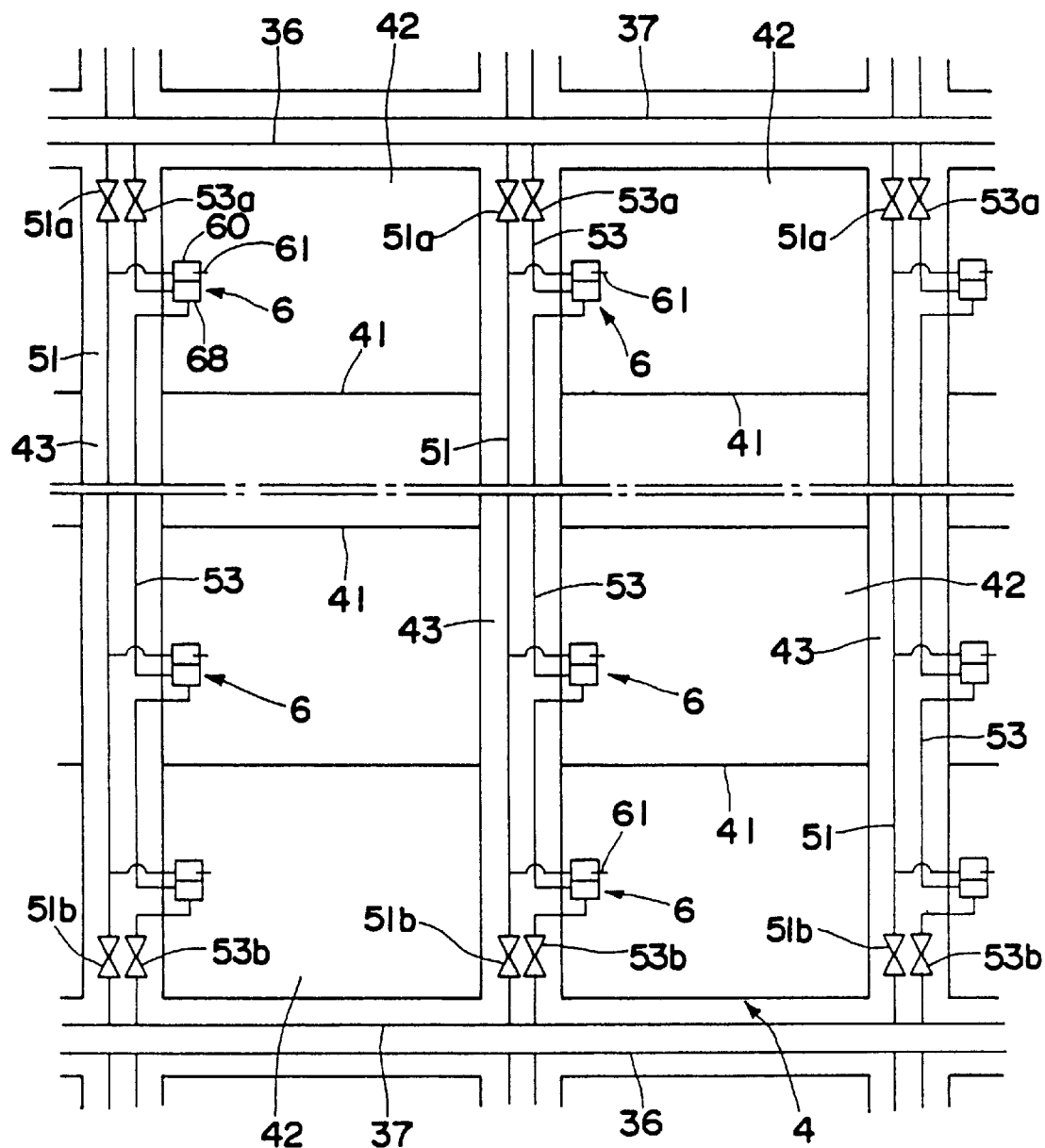
FIG. 14 is a schematic plan view showing an example of irrigation water control system employing water level regulating devices according to a third embodiment of the present invention.
Figure 15:
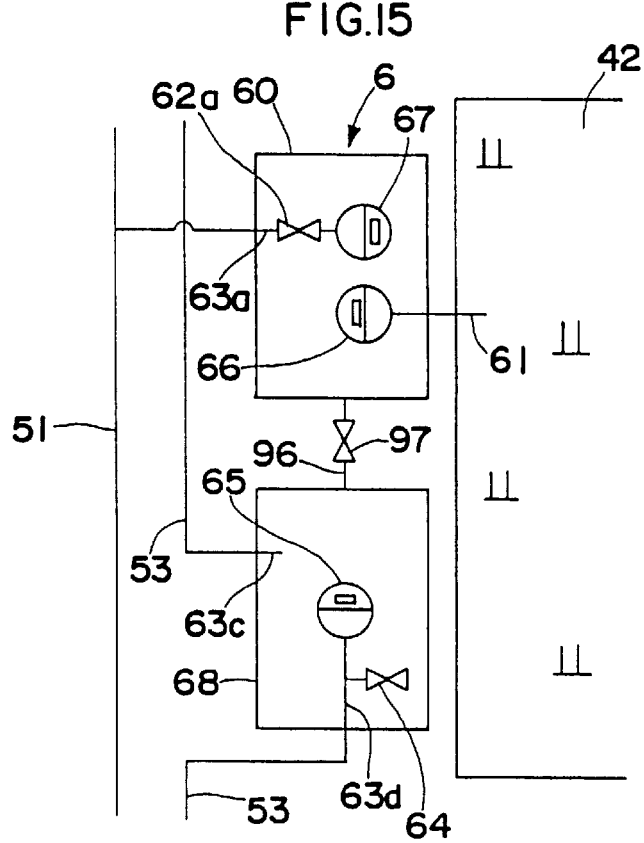
FIG. 15 is a schematic illustration of piping showing the water level regulating device of the third embodiment.
Figure 16:
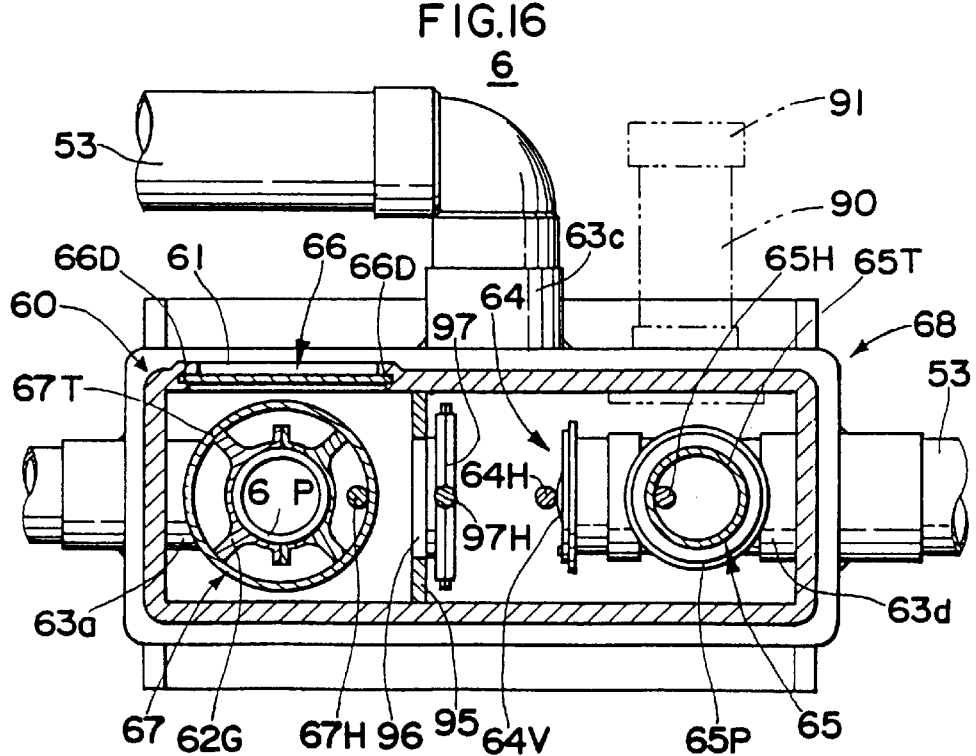
FIG. 16 is a plan view showing a typical configuration of the water level regulating device.
Figure 17:
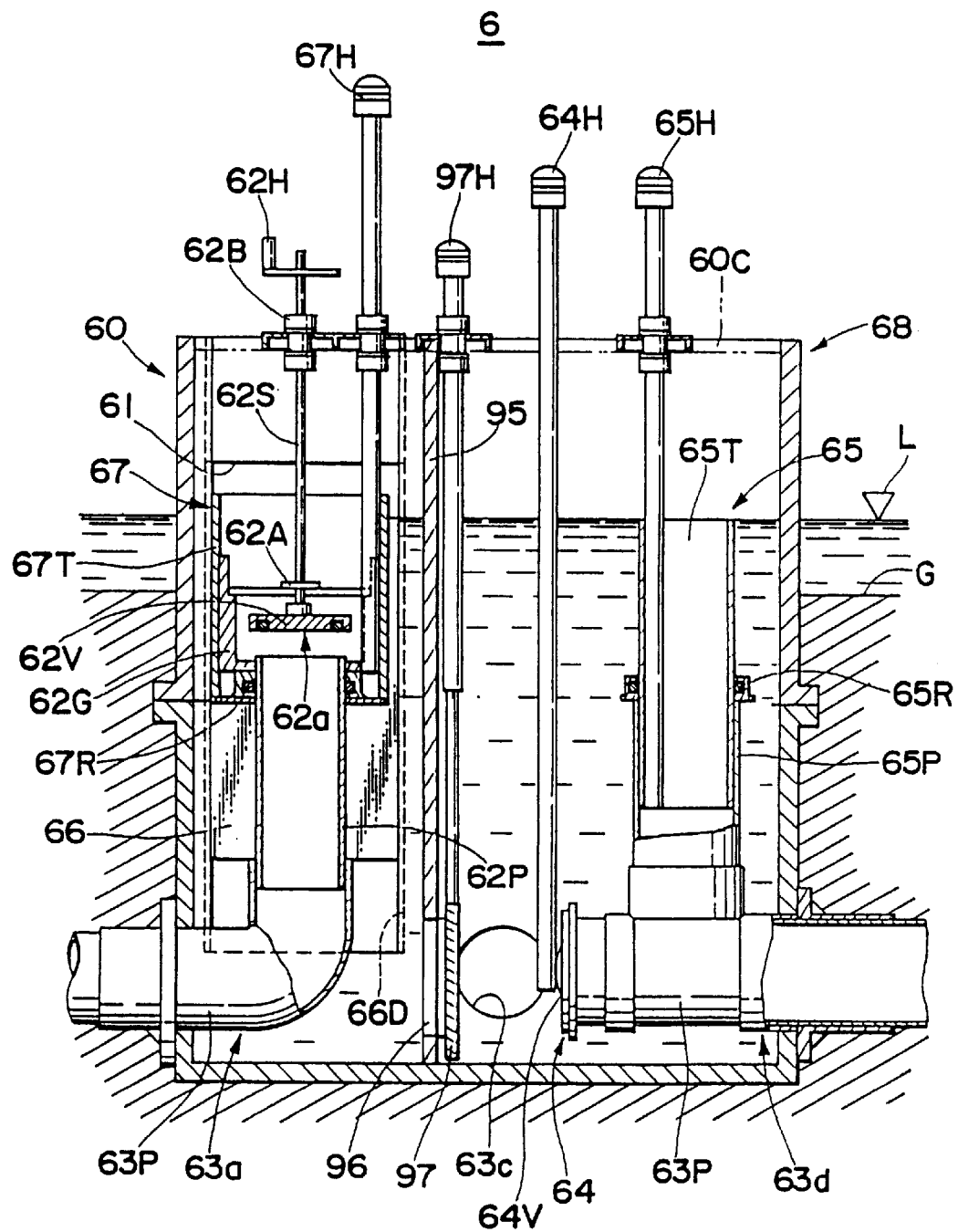
FIG. 17 is a vertical cross-sectional view of the water level regulating device.
Figure 18:
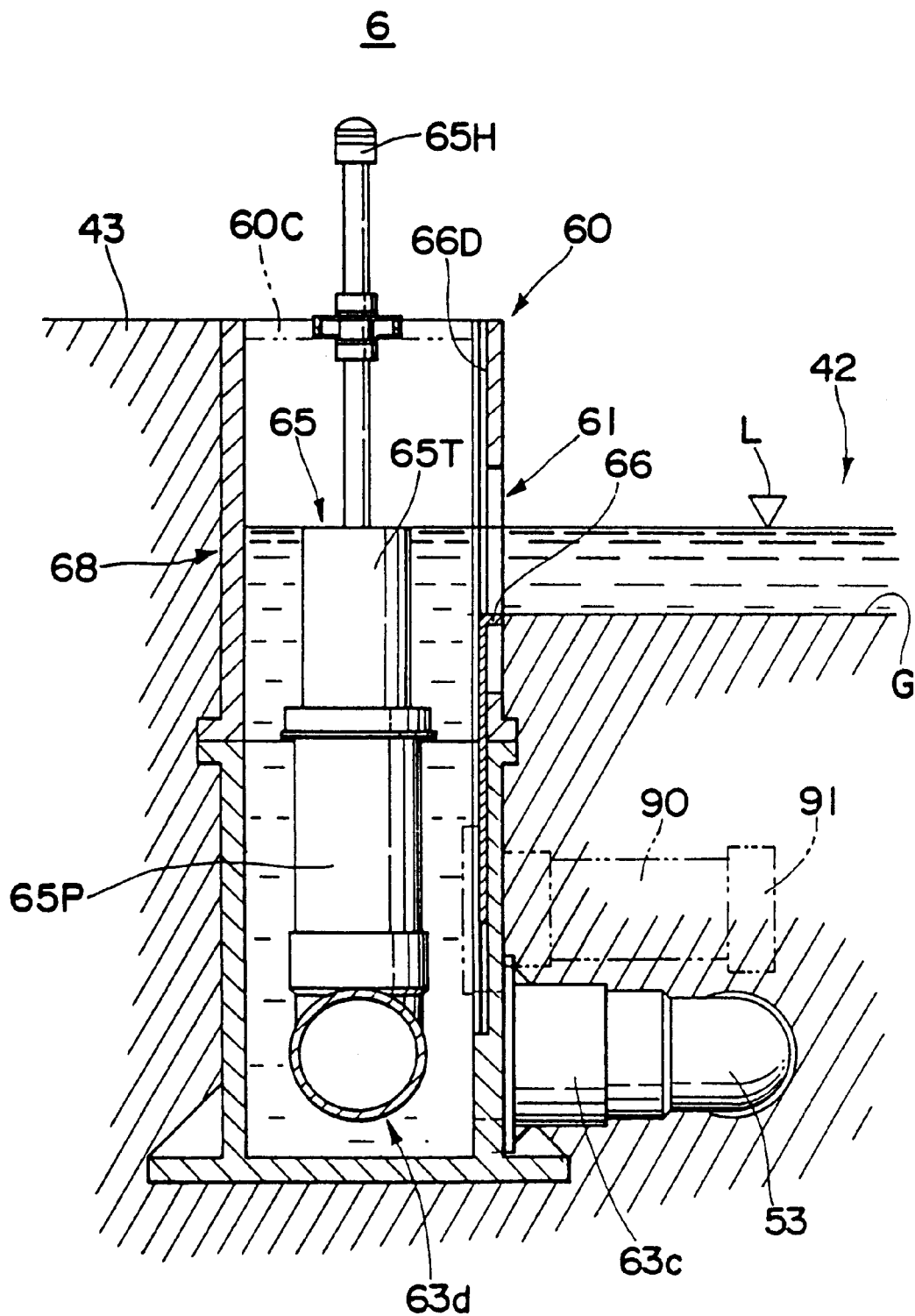
FIG. 18 is a vertical cross-sectional view showing a regulating water outflow section and a farming plot feed and drain port.

FIG. 14 is a schematic plan view showing an example of irrigation water control system employing water level regulating devices; FIG. 15 is a schematic illustration of piping showing the water level regulating device; FIG. 16 is a plan view; FIG. 17 is a vertical cross-sectional view; and FIG. 18 is a vertical cross-sectional view showing a regulating water outflow section and a farming plot feed and drain port.

The water level regulating device 6 according to this embodiment is installed between a group of pipes, including a watering pipe 51 and a water level regulating pipe 53 serving also as a drain pipe which are buried along a farm road, and each farming plot 42 to feed irrigation water supplied from the watering pipe 51 and from the upstream side of the water level regulating pipe 53 to the farming plot 42 and to drain the surplus irrigation water in the farming plot 42 to the downstream side of the water level regulating pipe 53. The water level regulating pipe 53 is connected via a valve 53a to an irrigation line 36 and via a valve 53b to a drainage line 37.

This water level regulating device 6 contains a rectangular feed and drain basin 60 with a closed bottom, having a farming plot feed and drain port 61 communicating with the farming plot 42; a water inflow section 63a located in the basin 60 near the bottom thereof and connected to the watering pipe 51; a feed valve 62a controlling supply of water located in the water inflow section 63a; a height-adjustable open-top check weir 67 located in the water inflow section 63a; a water level regulating basin 68 connected to the water level regulating pipe 53; a regulating water inflow section 63c located in the water level regulating basin 68 near the bottom thereof and connected to the upstream side of the water level regulating pipe 53; a regulating water outflow section 63d located in the water level regulating basin 68 near the bottom thereof and connected to the downstream side of the water level regulating pipe 53; a drain valve 64 located in the regulating water outflow section 63d; and a height-adjustable open-top water level regulating weir 65 located in the regulating water outflow section 63d. The farming plot feed and drain port 61 communicates via a height-adjustable overflow gate 66 with the farming plot 42.

The feed and drain basin 60 and the water level regulating basin 68 are juxtaposed integrally via a partition 95. A regulating water communicating section 96 formed in the partition 95 is provided with a cutoff valve 97 serving as regulating water blocking means for opening and closing the regulating water communicating section 96. The cutoff valve 97 is a gate valve which ascends and descends along the partition 95 and is provided with an operating rod 97H. This operating rod 97H may be calibrated to indicate the open/closed state etc. of the valve.

The feed valve 62a, the drain valve 64, the overflow gate 66 and the check weir 67 have the same constitutions as those of the counterparts in the second embodiment, respectively. The water level regulating weir 65 has the same constitution as that in the second embodiment and consists of a pipe 65P erecting perpendicular from a horizontal pipe 63P of the regulating water outflow section 63d; and a cylinder 65T fitted in the pipe 65P to be movable vertically.

The water level regulating devices 6 having the constitution described above are buried along the beveled faces of the farm roads 43 facing the farming plots 42 respectively, and the flooded water level L is set for each farming plot 42 by adjusting the height of the water level regulating weir 65.

Generally, in the water level regulating device 6 installed in each farming plot 42, the check weir 67 of the water inflow section 63a connected to the watering pipe 51 is set to be slightly higher than the flooded water level L, while the water level regulating weir 65 of the regulating water outflow section 63d connected to the downstream side of the water level regulating pipe 53 is set at the flooded water level L. Further, the drain valve 64 is closed fully, and the overflow gate 66 is set at a height lower than the flooded water level L and as high as or higher than the ground surface (field surface G).

Under this setting state, the irrigation water (regulating water) fed from the upstream side of the water level regulating pipe 53 and flowed through the regulating water inflow section 63c into the water level regulating basin 68 flows further therefrom into the feed and drain basin 60 through the regulating water communicating section 96. The water then flows over the overflow gate 66 of the farming plot feed and drain port 61 to be supplied to the farming plot 42. This feeding of irrigation water to the farming plot 42 is continued until the flooded water level L increases to reach a height exceeding the upper edge of the cylinder 65T of the water level regulating weir 65.

In this case, when the amount of irrigation water flowing from the water level regulating pipe 53 into the water level regulating device 6 is small, or when a large amount of irrigation water is to be supplied to the farming plot 42, the feed valve 62a of the water inflow section 63a is opened, and thus irrigation water can be supplied from the watering pipe 51 and through the water inflow section 63a to the water level regulating device 6.

When the flooded water level L in the farming plot 42 reaches a predetermined height to be as high as the upper edge of the cylinder 65T of the regulating water outflow section 63d, the surplus regulating water flowed into the water level regulating basin 68 flows directly over the water level regulating weir 65 and through the regulating water outflow section 63d to the downstream side of the water level regulating pipe 53 without flowing into the farming plot 42 and is fed to another water level regulating device 6 installed in the downstream farming plot 42. In this process, since the upper edge of the cylinder 67T of the check weir 67 is set at a position slightly higher than the flooded water level L, the irrigation water is prevented from flowing back from the water inflow section 63a to the watering pipe 51 even if feeding of irrigation water to the watering pipe 51 is stopped. Further, the earth and sand in the farming plot 42 are prevented from being carried into the feed and drain basin 60 by setting suitably the position of the overflow gate 66.

If a fixed water level is maintained in the upstream farming plot 42 as described above, surplus regulating water is supplied through the downstream water level regulating devices 6 to the respective farming plots 42, and thus fixed flooded water levels can be maintained in these farming plots 42 likewise. Since the amount of irrigation water to be supplied to the farming plot 42 can be reduced by carrying out control of irrigation water as described above, irrigation water can be distributed evenly throughout the farming plots 42 from the upstream side to the downstream side, avoiding lack of water from occurring in the downstream farming plots 42. Further, in the state where a fixed flooded water level L is maintained in the farming plot 42, the irrigation water in the farming plot 42 is not substantially discharged to the outside, so that agricultural chemicals, fertilizers, etc. applied to the farming plot 42 scarcely flow out together with the irrigation water or rainwater, eliminating the fear of environmental disruption.

If the water level in the farming plot 42 is increased by rainwater and the like, the surplus water in the farming plot 42 flows from the farming plot feed and drain port 61 and through the feed and drain basin 60 and the regulating water communicating section 96 into the water level regulating basin 68 to flow further therefrom over the upper edge of the cylinder 65T to be drained from the regulating water outflow section 63d, as described above. Thus, a fixed water level is maintained constantly in each farming plot 42.

Meanwhile, when irrigation water is drained from the farming plot 42, the feed valve 62a of the water inflow section 63a is closed, and the cylinder 65T of the water level regulating weir 65 in the regulating water outflow section 63d is pushed down or the drain valve 64 is opened. Thus, the irrigation water held in the farming plot 42 can be drained through the farming plot feed and drain port 61, the feed and drain basin 60, the regulating water communicating section 96 and the water level regulating basin 68 to the downstream side of the water level regulating pipe 53.

Further, if the drain valve 64 locating at the bottom of the water level regulating basin 68 is opened, the earth, sand, etc. carried from the farming plot 42 and the like and through the farming plot feed and drain port 61 into the feed and drain basin 60 can be discharged through the drain valve 64 together with the irrigation water to the downstream side of the water level regulating pipe 53.

Meanwhile, in puddling of paddy fields which requires a large amount of irrigation water at one time, the feed valve 62a is opened fully, and the cylinder 67T of the check weir 67 is pushed down, while the cylinder 65T of the water level regulating weir 65 in the regulating water outflow section 63d is pulled up, or the cutoff valve 97 is closed. Thus, the irrigation water fed from the watering pipe 51 flows through the water inflow section 63a into the farming plot 42 and is entirely supplied into the farming plot 42 to be held therein without being discharged through the regulating water outflow section 63d to reach quickly a predetermined water level. By repeating these procedures for each farming plot 42, irrigation water can be supplied throughout the farming plots 42 from the upstream side to the downstream side successively.

Further, in the case where some farming plots 42 need not be irrigated due to cutback on rice acreage or other reasons, the feed valves 62a in the water level regulating devices 6 of the relevant farming plots 42 are closed, and the cylinders 65T of the water level regulating weirs 65 are pushed down, or the drain valves 64 are opened fully, while the overflow gates 66 are pushed down. Thus, the irrigation water in the farming plots 42 can be drained therefrom through the water level regulating devices 6 into the water level regulating pipe 53. If the cutoff valve 97 is closed after completion of drainage, the regulating water flowed from the regulating water inflow section 63c into the water level regulating basin 68 is prevented from flowing into the feed and drain basin 60, so that if the cylinders 65T of the water level regulating weirs 65 are pushed down, water can be supplied and drained as usual to and from other farming plots 42 while supply of water is stopped to those farming plots 42 which are provided with such water level regulating devices 6.

Since the amounts of irrigation water flowing through the watering pipe 51 and the water level regulating pipe 53 can be reduced according to the water level regulating device 6 having such a constitution, small-diameter pipes can be employed as these pipes. Further, this water level regulating device 6 can be produced by suitably combining synthetic resin cylinders and the like and is integrated into the feed and drain basin 60, the water inflow section 63a, the regulating water inflow section 63c and the regulating water outflow section 63d may merely be connected directly or via suitable joints to the watering pipe 51 and the water level regulating pipe 53 respectively, leading to reduction in the installation cost etc. on a great margin.

Further, as depicted by imaginary lines in FIGS. 16 and 18, the water level regulating basin 68 may be provided with a drain pipe 90 closed with a cap 91, and thus the actions and effects obtained in the second embodiment can be exhibited likewise. Incidentally, the feed and drain basin and the water level regulating basin may be formed separately and connected with a pipe having a cutoff valve.

The water level regulating device according to a fourth embodiment of the present invention will be described specifically referring to FIGS. 19 to 23.

Figure 19:
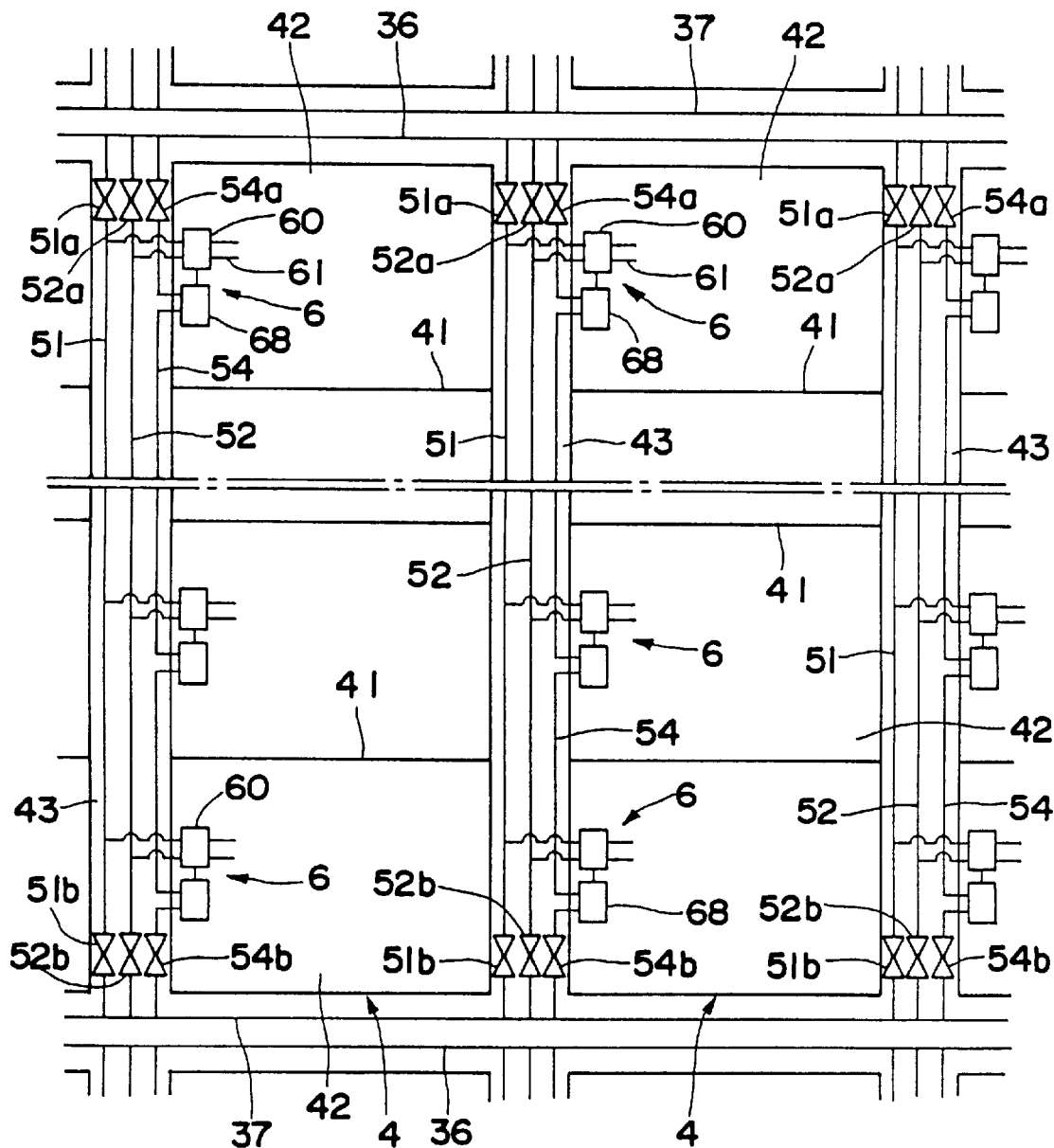
FIG. 19 is a schematic plan view showing an example of irrigation water control system employing water level regulating devices according to a fourth embodiment of the present invention.
Figure 20:
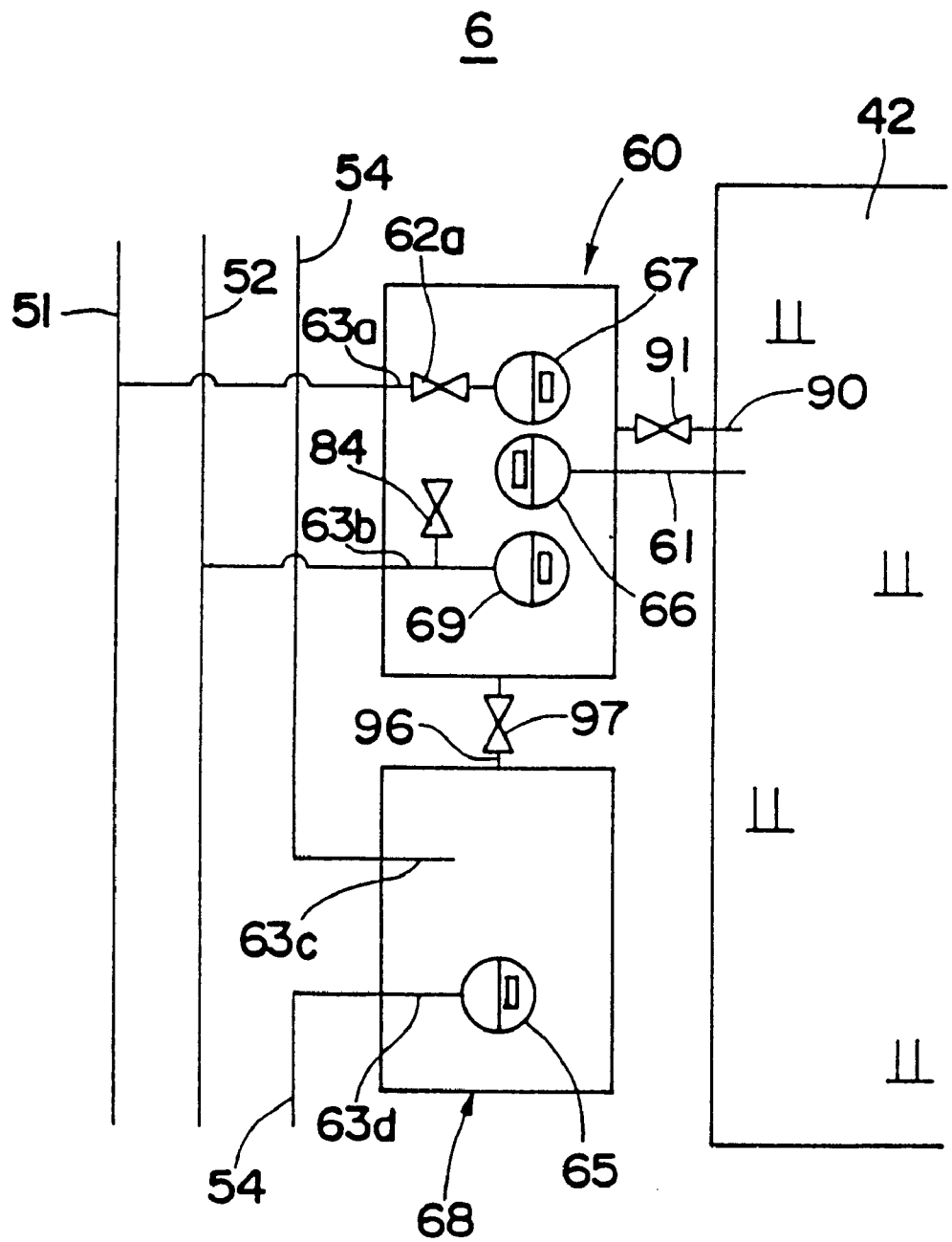
FIG. 20 is a schematic illustration of piping showing the water level regulating device of the fourth embodiment.
Figure 21:
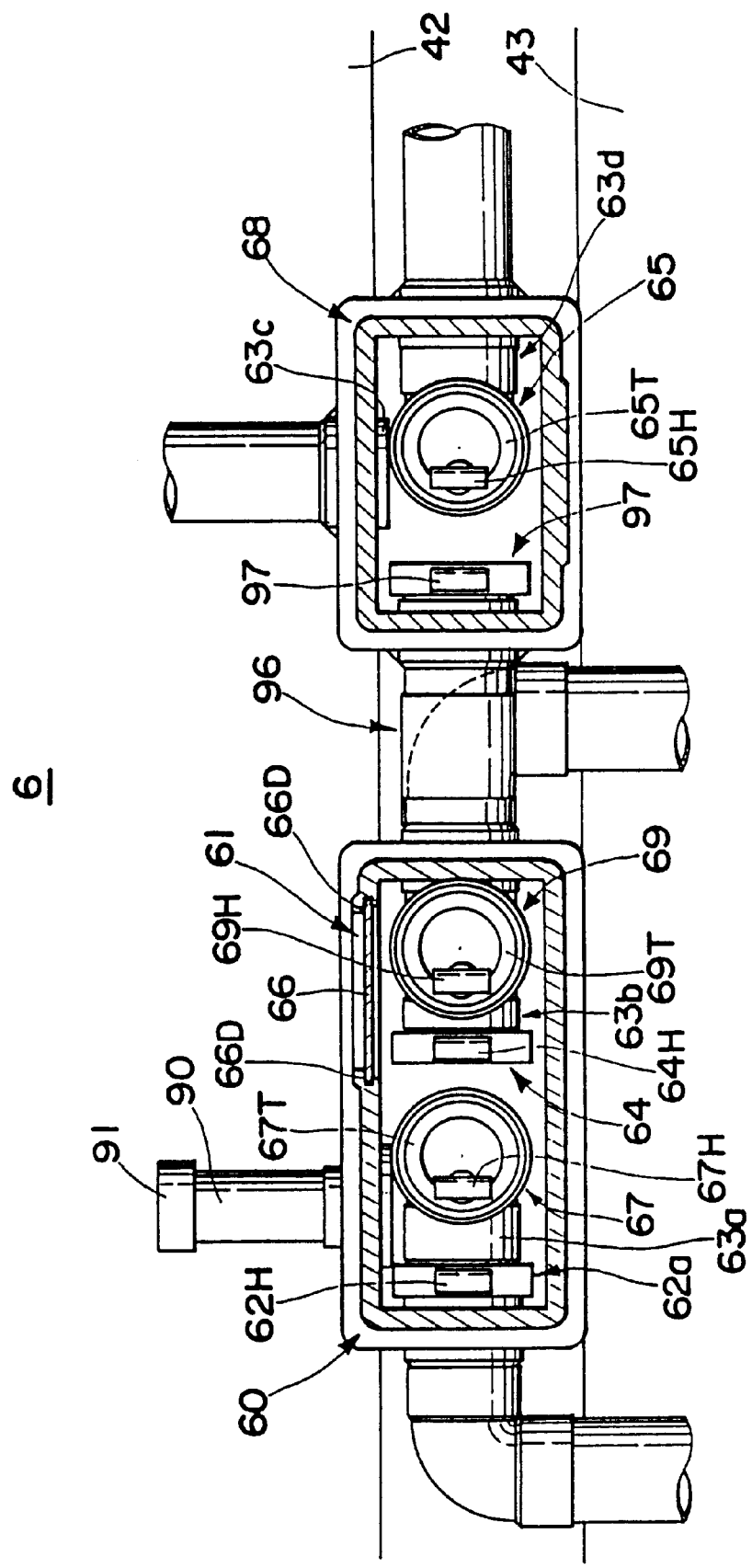
FIG. 21 is a plan view showing a typical configuration of the water level regulating device.
Figure 22:
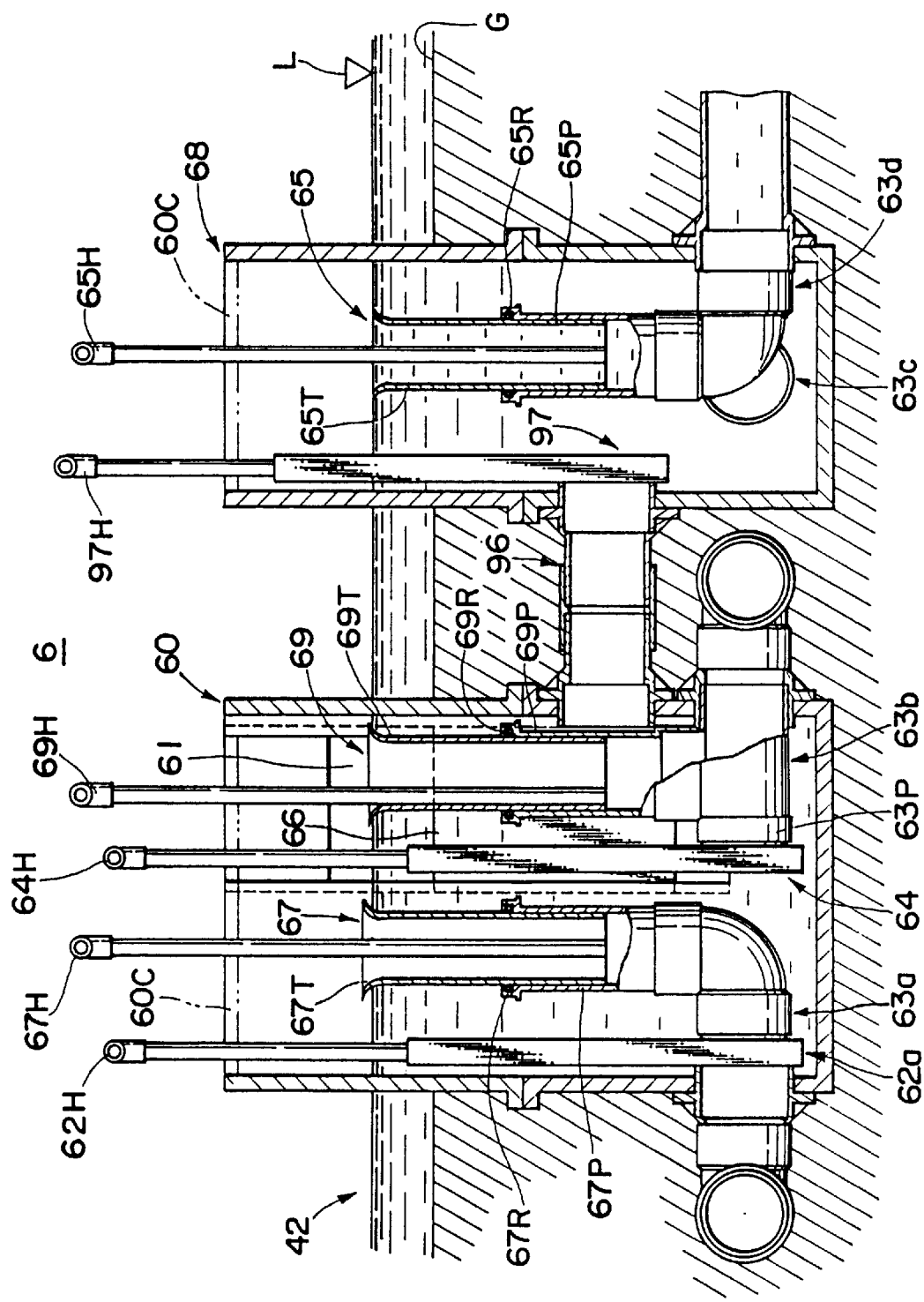
FIG. 22 is a vertical cross-sectional view of the water level regulating device.
Figure 23:
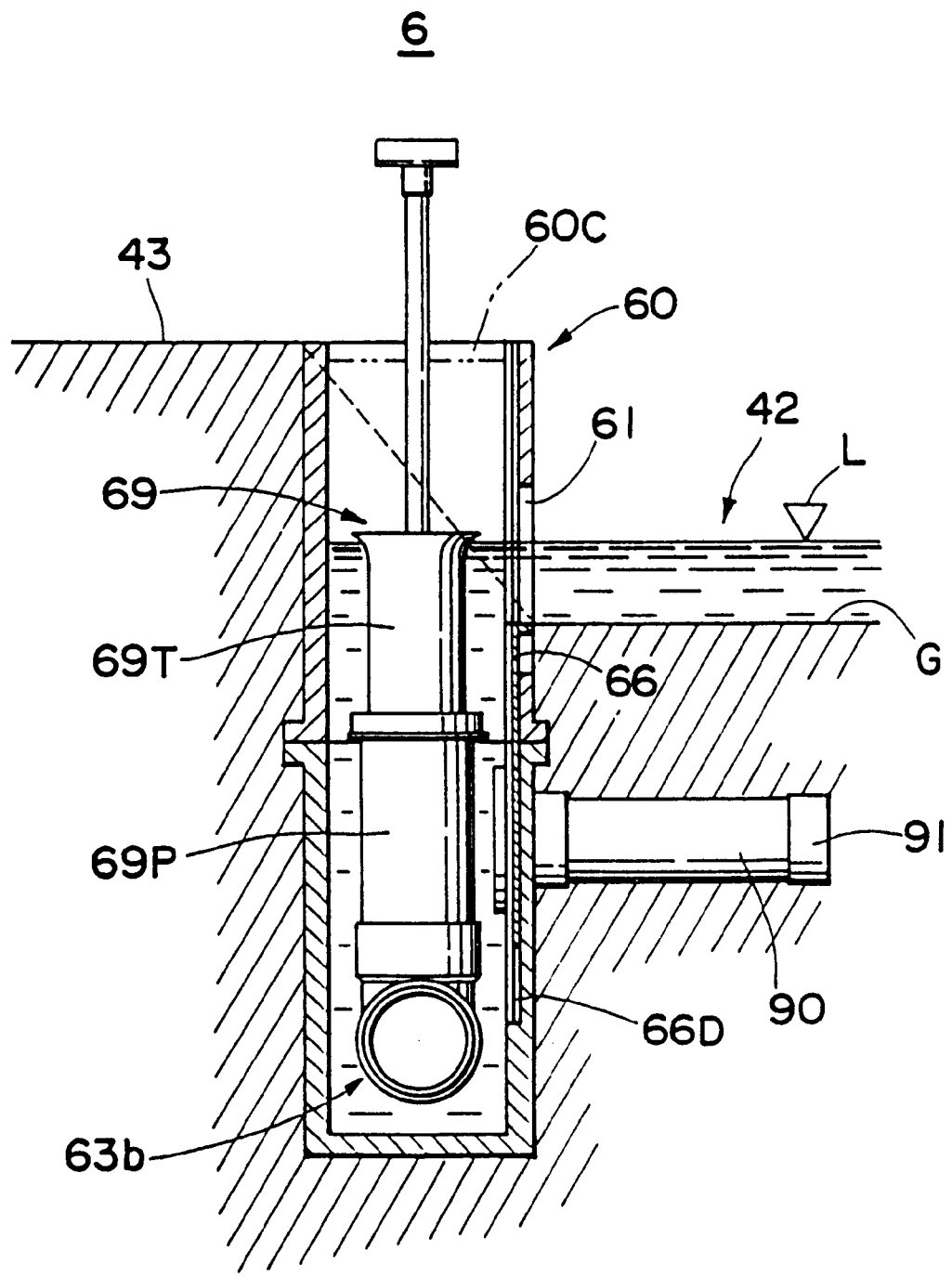
FIG. 23 is a vertical cross-sectional view showing a regulating water outflow section and a farming plot feed and drain port.

FIG. 19 is a schematic plan view showing an example of irrigation water control system employing water level regulating devices; FIG. 20 is a schematic illustration of piping showing the water level regulating device; FIG. 21 is a plan view; FIG. 22 is a vertical cross-sectional view; and FIG. 23 is a vertical cross-sectional view showing a regulating water outflow section and a farming plot feed and drain port.

The water level regulating device 6 according to this embodiment is installed between a group of pipes, including a watering pipe 51, a drain pipe 52 and a water level regulating pipe 54 which are buried along a farm road 43, and each farming plot 42 to feed irrigation water supplied from the watering pipe 51 and from the upstream side of the water level regulating pipe 54 to the farming plot 42 and to drain the surplus irrigation water in the farming plot 42 to the downstream side of the water level regulating pipe 54, and is also designed to be capable of draining the irrigation water in the farming plot 42 to the drain pipe 52. The water level regulating pipe 54 is connected via a valve 54a to an irrigation line 36 and via a valve 54b to a drainage line 37.

This water level regulating device 6 contains a rectangular feed and drain basin 60 with a closed bottom, having a farming plot feed and drain port 61 communicating with the farming plot 42; a water inflow section 63a located in the feed and drain basin 60 near the bottom thereof and connected to the watering pipe 51; a feed valve 62a for controlling supply of irrigation water located in the water inflow section 63a; a water drain section 63b located in the feed and drain basin 60 near the bottom thereof and connected to the drain pipe 52; a drain valve 64 located in the water drain section 63b; a height-adjustable open-top drainage regulating weir 69 located in the water drain section 63b; a water level regulating basin 68 connected to the water level regulating pipe 54; a regulating water inflow section 63c located in the water level regulating basin 68 near the bottom thereof and connected to the upstream side of the water level regulating pipe 54; a regulating water outflow section 63d located in the water level regulating basin 68 near the bottom thereof and connected to the downstream side of the water level regulating pipe 54; and a height-adjustable open top water level regulating weir 65 located in the regulating water outflow section 63d. The farming plot feed and drain port 61 communicates via a height-adjustable open-top overflow gate 66 with the farming plot 42.

The feed and drain basin 60 and the water level regulating basin 68 are connected to each other by a regulating water communicating section 96 having a cutoff valve 97. Incidentally, the feed and drain basin 60 and the water level regulating basin 68 may be juxtaposed integrally via a partition having a regulating water communicating section 96 and a cutoff valve 97 like in the third embodiment.

The drainage regulating weir 69 consists of a cylinder 69T fitted in the upper end opening of a pipe 69P erecting perpendicular from a pipe 63P of the water drain section 63b to be slidable vertically via a rubber seal packing 69R. This cylinder 69T also has an operating rod 69H extending upward beyond the upper opening of the feed and drain basin 60. Further, the feed and drain basin 60 is provided with a drain pipe 90 opening down into the ground under the farming plot. A cap 91 is fitted to this drain pipe 90 as blocking means which can be opened and closed.

The feed valve 62a, the drain valve 64, the water level regulating weir 65, the overflow gate 66 and the check weir 67 have the same constitutions as those of the counterparts in the second and third embodiments, respectively.

The water level regulating devices 6 having the constitution described above are buried along the beveled faces of the farm roads 43 facing the farming plots 42 respectively, and the flooded water level L is set for each farming plot 42 by adjusting the height of the water level regulating weir 65.

Generally, in the water level regulating device 6 installed in each farming plot 42, the check weir 67 and the drainage regulating weir 69 are set such that the upper edges of the cylinders 67T and 69T may be located slightly higher than the flooded water level L, while the water level regulating weir 65 is set such that the upper edge of the cylinder 65T may be at the flooded water level L. Further, the feed valve 62a, the drain valve 64 and the cutoff valve 97 are closed or opened appropriately, closed fully and opened fully, respectively, while the overflow gate 66 is set at a height lower than the flooded water level L and as high as or higher than the ground surface (field surface G).

Under this setting state, the regulating water fed from the upstream side of the water level regulating pipe 54 and through the regulating water inflow section 63c into the water level regulating basin 68 flows therefrom, through a regulating water communicating section 96, into a feed and drain basin 60 to flow further through the farming plot feed and drain port 61 to be supplied to the farming plot 42. This feeding of irrigation water to the farming plot 42 is continued until the water level in the farming plot 42 increases to be as high as the upper edge of the cylinder 65T of the regulating water outflow section 63d.

In this process, if the amount of irrigation water flowing from the water level regulating pipe 54 into the water level regulating device 6 is small, or when a large amount of irrigation water is to be supplied to the farming plot 42, the feed valve 62a is opened, and thus irrigation water can be supplied from the watering pipe 51 to the water level regulating device 6 through the water inflow section 63a.

When the flooded water level L reaches the height of the upper edge of the cylinder 65T in the regulating water outflow section 63d, the surplus regulating water flowed into the water level regulating basin 68 is not supplied to the farming plot 42 but flows over the upper edge of the cylinder 65T and down through the pipe 65P to be fed to the downstream side of the water level regulating pipe 54 through the regulating water outflow section 63d. In this state, since the upper edge of the cylinder 69T of the water drain section 63b is located higher than the water level, the irrigation water (regulating water) is prevented from being drained from the water drain section 63b to the drain pipe 52. Further, since the upper edge of the cylinder 67T of the water inflow section 63a is also set at a position higher than the water level, the irrigation water does not flow back from the water inflow section 63a to the watering pipe 51 even if supply of irrigation water to the watering pipe 51 is stopped. Further, the earth and sand in the farming plot 42 are prevented from being carried into the feed and drain basin 60 by setting suitably the position of the overflow gate 66.

Accordingly, if a fixed water level is maintained in the upstream farming plot 42, surplus regulating water is supplied through the downstream water level regulating devices 6 to the respective farming plot 42, and thus fixed flooded water levels L can be maintained therein likewise. Since the amount of irrigation water to be supplied to each farming plot 42 can be reduced by carrying out control of irrigation water as described above, irrigation water can be distributed evenly throughout the farming plots 42 from the upstream side to the downstream side, avoiding lack of water from occurring in the downstream farming plots 42. Further, in the state where a fixed flooded water level L is maintained in the farming plot 42, the irrigation water in the farming plot 42 is not substantially discharged to the outside, so that agricultural chemicals, fertilizers, etc. applied to the farming plot 42 scarcely flow out together with the irrigation water or rainwater, eliminating the fear of environmental disruption.

If the water level in the farming plot 42 is increased by rainwater and the like, the surplus water in the farming plot 42 flows from the farming plot feed and drain port 61 and through the feed and drain basin 60 and the regulating water communicating section 96 into the water level regulating basin 68 to be drained through the regulating water outflow section 63d, as described above. Further, if the water level is increased quickly due to localized torrential downpour or the like, the surplus water flowed into the feed and drain basin 60 flows over the upper edge of the cylinder 69T of the water drain section 63b to be drained through the water drain section 63b into the drain pipe 52. Thus, a fixed water level can be maintained constantly in each farming plot 42.

Meanwhile, when irrigation water is drained from the farming plot 42, the feed valve 62a and the cutoff valve 97 are closed, and the cylinder 69T of the water drain section 63b is pushed down or the drain valve 64 is opened. Thus, the irrigation water held in the farming plot 42 flows through the farming plot feed and drain port 61 into the feed and drain basin 60 to be drained through the water drain section 63b into the drain pipe 52.

Further, if the drain valve 64 is opened, the earth, sand, etc. carried from the farming plot 42 and the like into the feed and drain basin 60 through the farming plot feed and drain port 61 can be discharged together with the irrigation water into the drain pipe 52. In addition, if the regulating water communicating section 96 is located at a predetermined height from the bottom, the earth, sand, etc. carried from the farming plot 42 into the feed and drain basin 60 can be prevented from migrating into the water level regulating basin 68.

Meanwhile, in puddling of paddy fields which requires a large amount of irrigation water at one time, the feed valve 62a is opened fully, and the cylinder 67T of the check weir 67 is pushed down, while the cylinder 69T of the water drain section 63b is pulled up and the cylinder 65T of the regulating water outflow section 63d is pulled up or the cutoff valve 97 is closed. Thus, the irrigation water fed from the watering pipe 51 flows through the water inflow section 63a into the farming plot 42 and is entirely supplied into the farming plot 42 to be held therein without being discharged through the water drain section 63b or the regulating water outflow section 63d to reach quickly a predetermined water level. By repeating these procedures for each farming plot 42, irrigation water can be supplied throughout the farming plots 42 from the upstream side to the downstream side successively.

Further, in the case where some farming plots 42 need not be irrigated due to cutback on rice acreage or other reasons, the feed valves 62a and the drain valves 64 of the relevant farming plots 42 are closed and opened fully respectively, and the overflow gates 66 are pushed down. Thus, the irrigation water in the farming plots 42 can be drained therefrom through the water level regulating devices 6 into the drain pipe 52. In this process, if the cutoff valves 97 is closed, the regulating water flowed from the regulating water inflow section 63c into the water level regulating basin 68 is prevented from flowing into the feed and drain basin 60, so that if the cylinder 65T of the water level regulating weir 65 is pushed down, water can be supplied and drained as usual to other farming plots 42 while supply of water is stopped to those farming plots 42 which are provided with such water level regulating devices 6.

Since the amount of irrigation water flowing through the watering pipe 51 and the water level regulating pipe 54 can be reduced according to the water level regulating device 6 having such a constitution, small-diameter pipes can be employed as these pipes. Further, some degrees of flow rate can be secured in the pipes 51, 52 and 54 without sloping them steeply, so that the procedures of installing water level regulating devices 6 in each farming plot 42 can be facilitated. Besides, since this water level regulating device 6 can be produced by suitably combining synthetic resin cylinders and the like, the water inflow section 63a, the water drain section 63b, the regulating water inflow section 63c and the regulating water outflow section 63d may merely be connected directly or via suitable joints to the watering pipe 51, the water level regulating pipe 54 and the drain pipe 52, respectively, leading to reduction in the installation cost etc. on a great margin.

Figure 24:
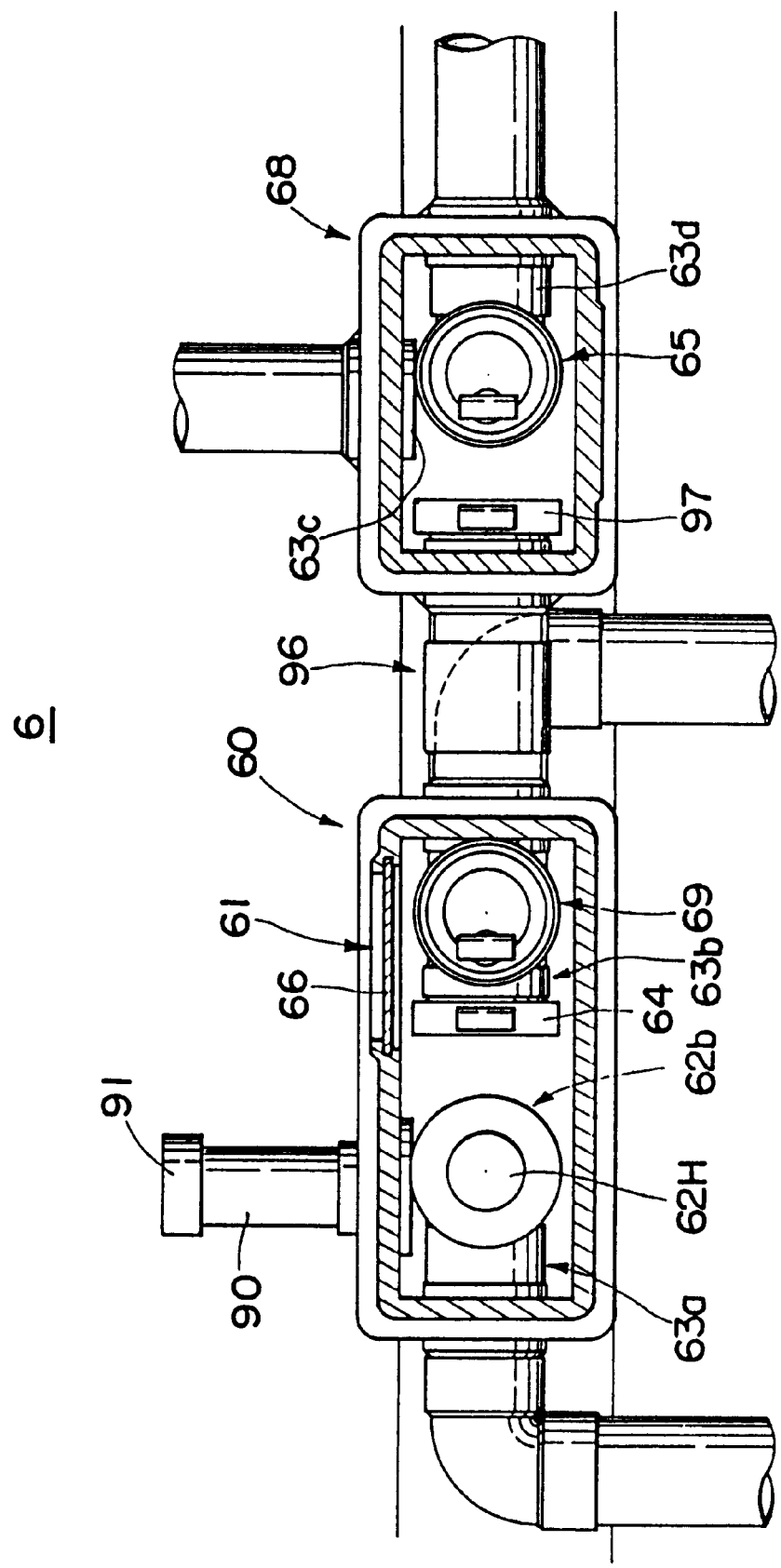
FIG. 24 is a plan view showing a variation of the water level regulating device.
Figure 25:
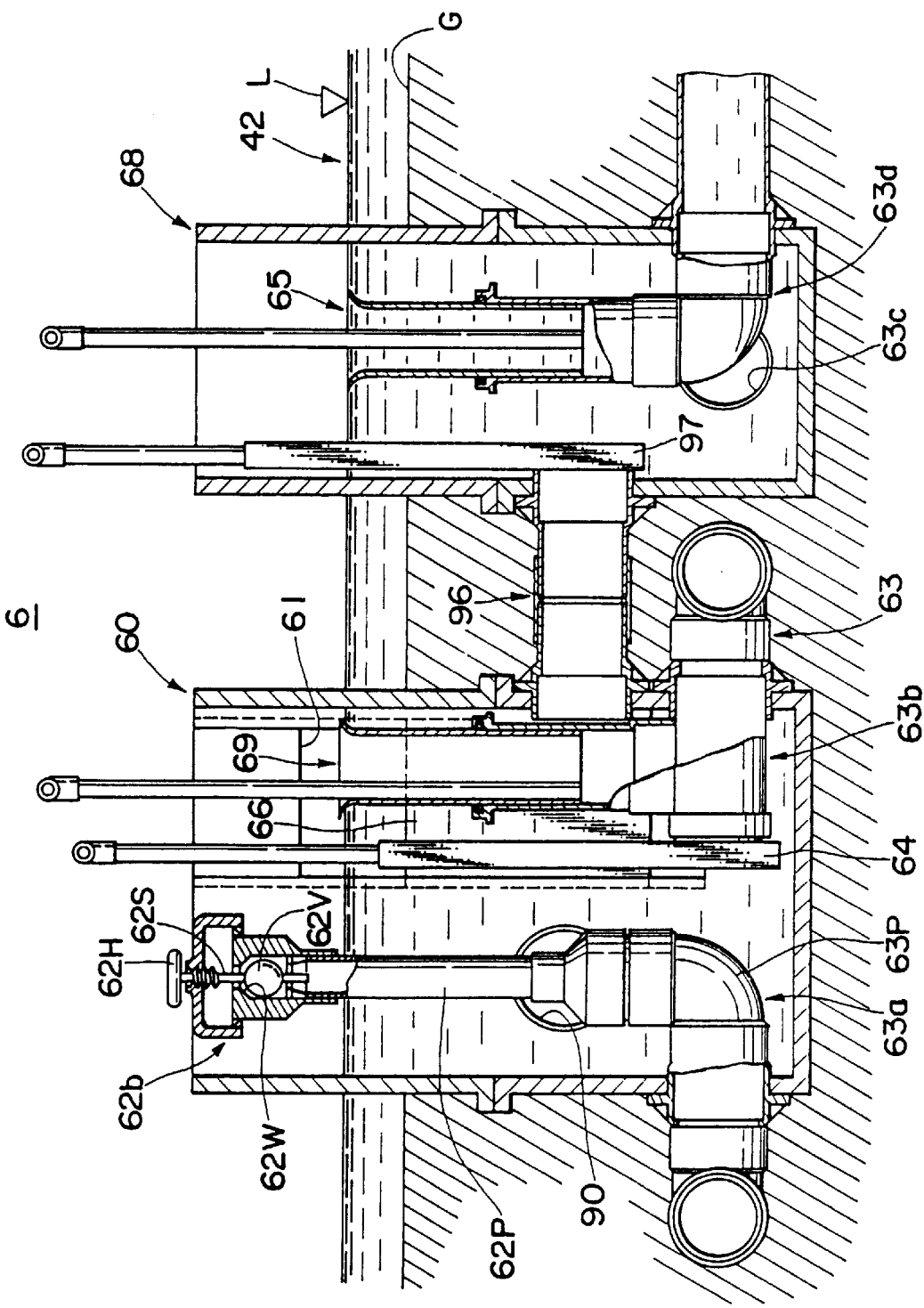
FIG. 25 is a vertical cross-sectional view of the water level regulating device according to the variation.

FIGS. 24 and 25 show a variation of the water level regulating device according to the fourth embodiment: FIG. 24 is a plan view; and FIG. 25 is a vertical cross-sectional view. The water level regulating device 6 according to this variation is designed to have a structure that is suitably employed when the pressure of the irrigation water fed from the watering pipe 51 is relatively high. In this water level regulating device 6, the feed valve 62a and check weir 67 which are located in the water inflow section 63a are replaced with a feed valve 62b employing a floating valve located in the water inflow section 63a.

This feed valve 62b is attached to the upper end of a vertical pipe 62P connected to the pipe 63P of the water inflow section 63a and has a valve structure in which a ball float valve 62V is opened by pushing it down with a valve stem 62S operated by a handle 62H and is closed when the handle 62H is turned to ascend the valve stem 62S to allow the float valve 62V to be pressed by the water flowing up through the pipe 62P against a valve seat 62W. Accordingly, inflow of irrigation water can be controlled by adjusting the lift of the valve stem 62S.

The water level regulating device 6 employing this feed valve 62b enjoys advantages that it can eliminate air collecting in the watering pipe 51 to prevent insufficient water feeding from occurring and that it can prevent damage of the watering pipe 51 to be caused when the internal pressure of the pipe becomes negative momentarily.

Referring to other constituents of the water level regulating device 6 of this variation, major parts of the same constituents as in the water level regulating device 6 of the fourth embodiment are affixed with the same reference numbers respectively and detailed description of them will be omitted. Further, since regulation of water level and drainage are carried out in the same manner as described above, description of actions will be omitted also.

The water level regulating device according to a fifth embodiment of the present invention will be described specifically referring to FIGS. 26 to 30.

Figure 26:
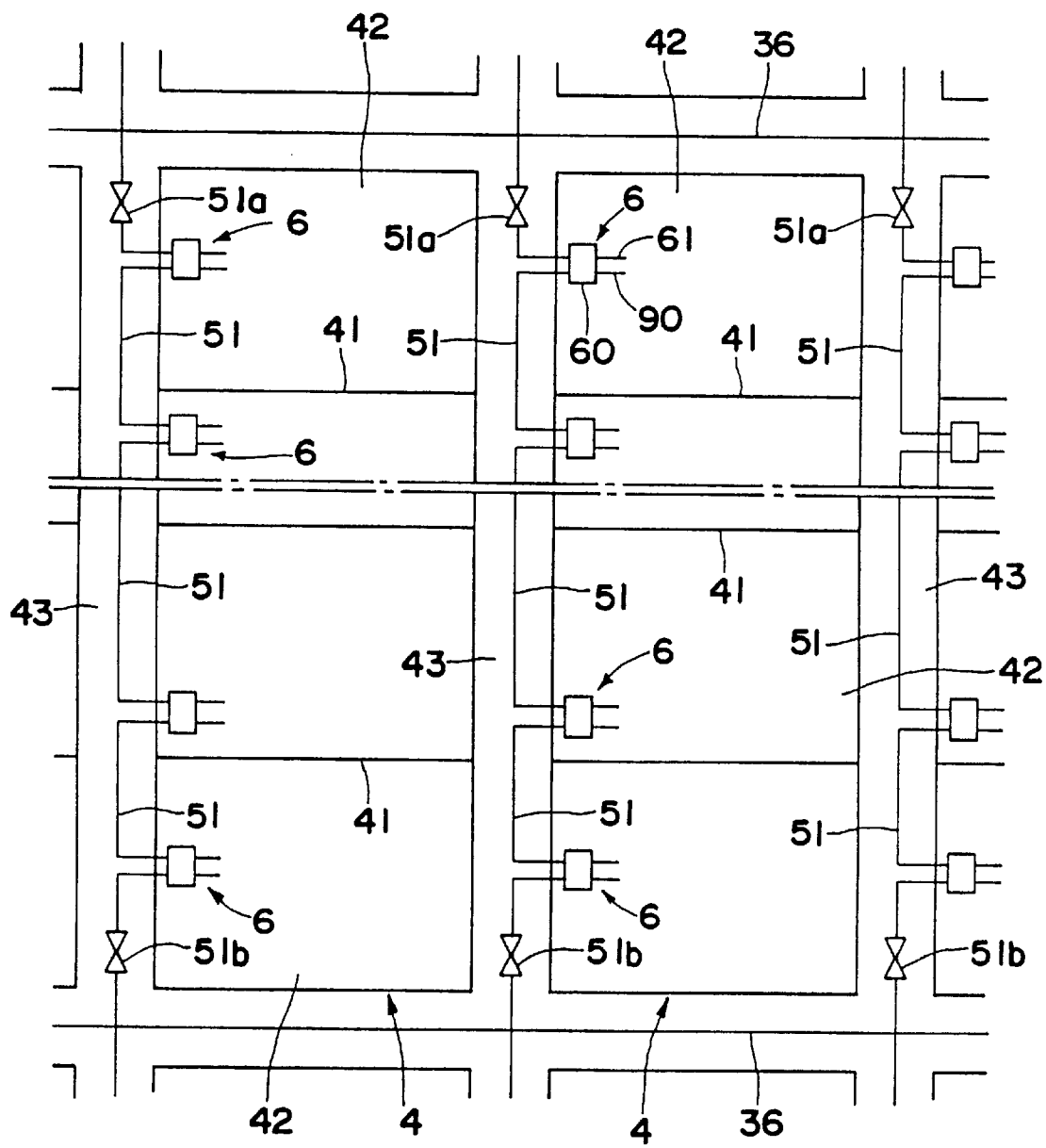
FIG. 26 is a schematic plan view showing an example of irrigation water control system employing water level regulating devices according to a fifth embodiment of the present invention.
Figure 27:
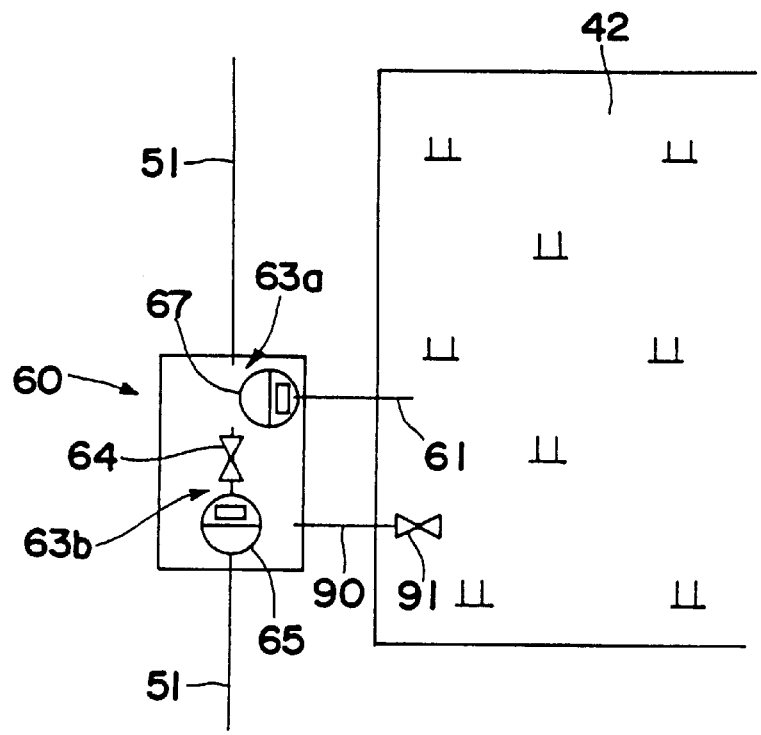
FIG. 27 is a schematic illustration of piping showing the water level regulating device of the fifth embodiment.
Figure 28:
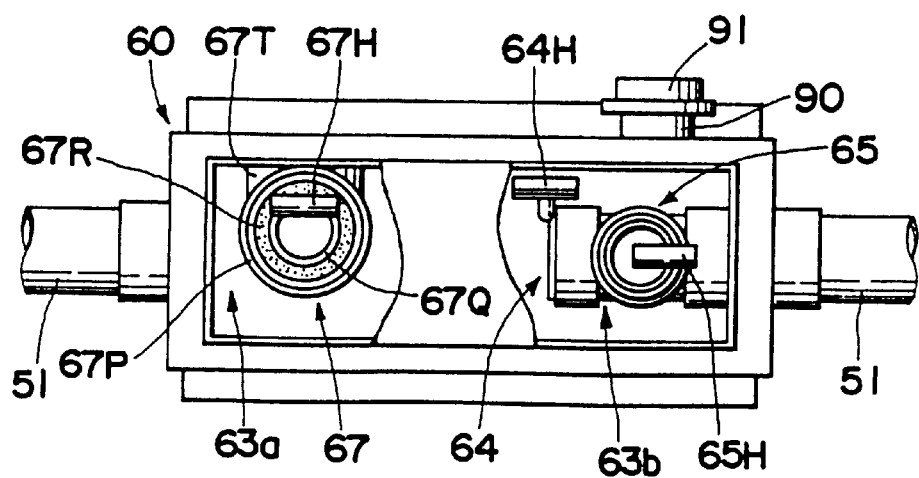
FIG. 28 is a plan view showing a typical configuration of the water level regulating device.
Figure 29:
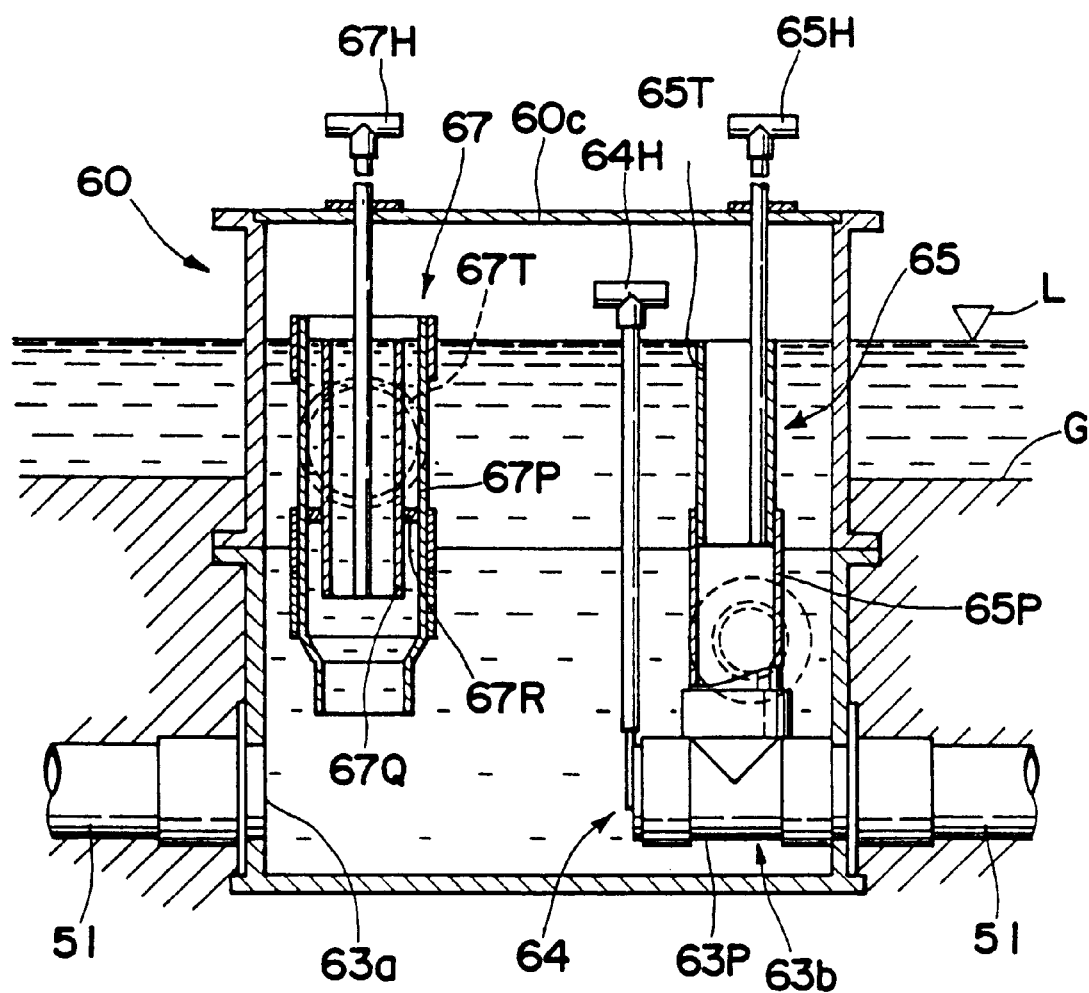
FIG. 29 is a cross-sectional front view of the water level regulating device shown in FIG. 28.
Figure 30:
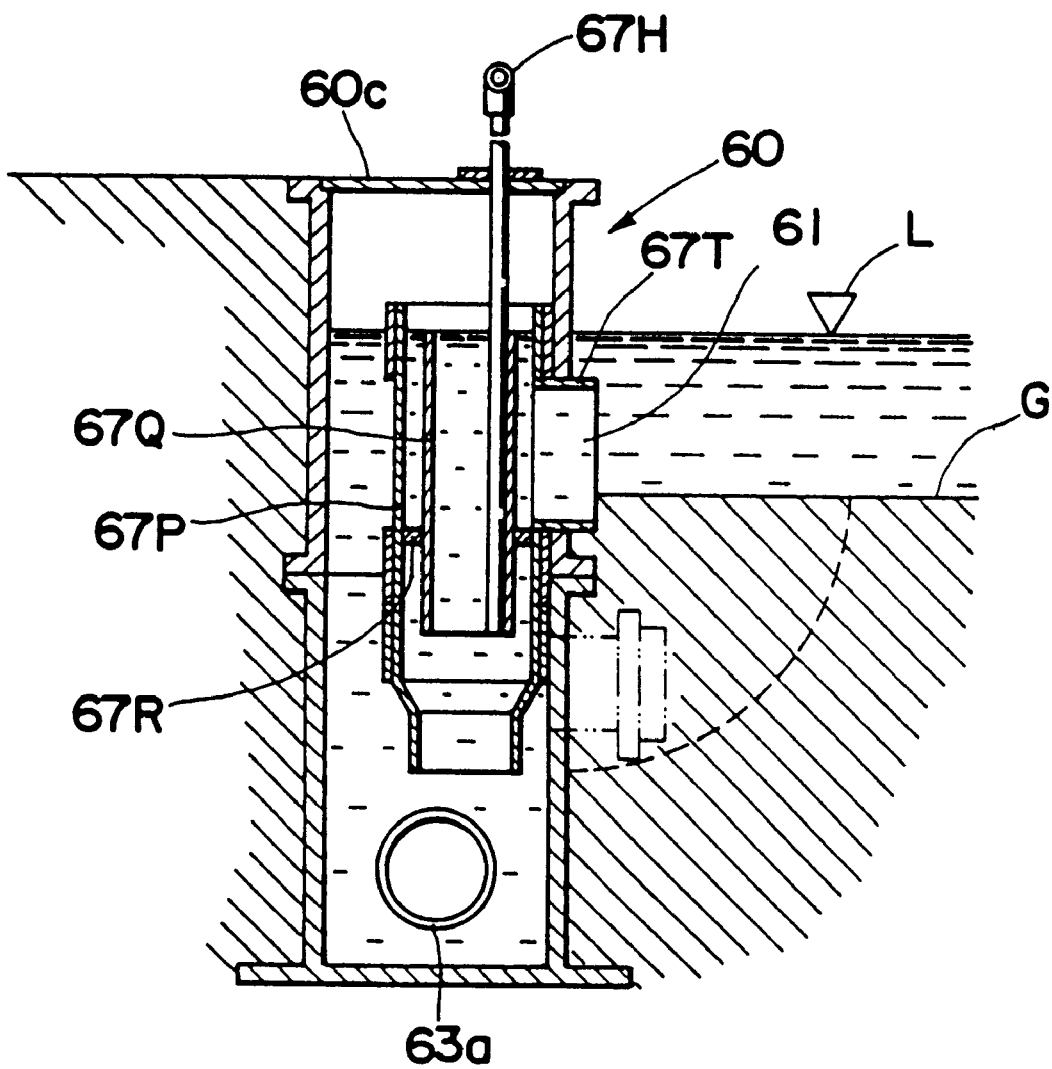
FIG. 30 is a cross-sectional side view of the water level regulating device.
Figure 31:
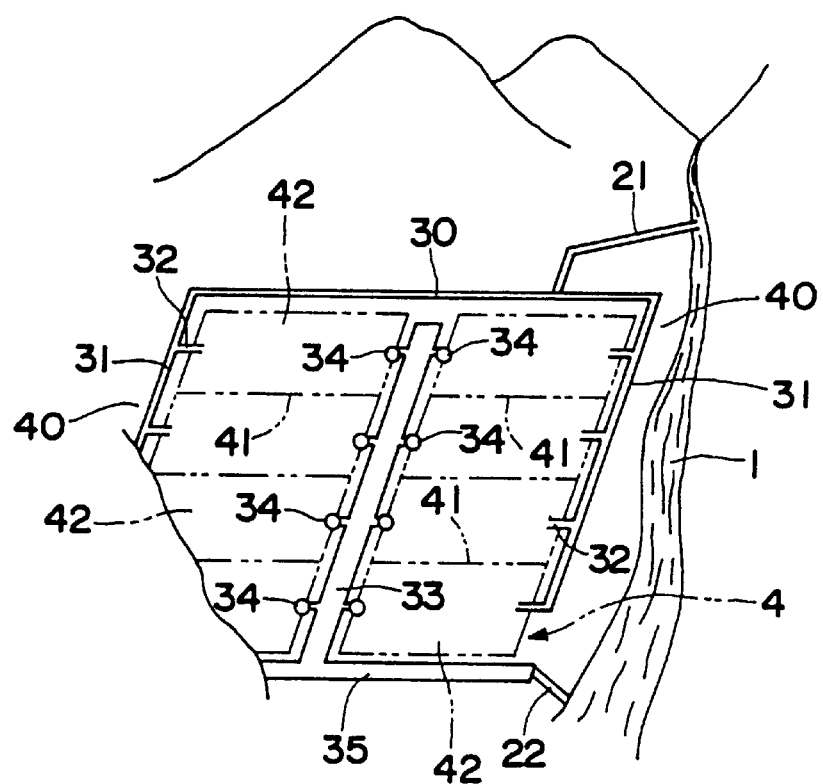
FIG. 31 is a schematic plan view showing the conventional paddy field structure.
Figure 32:
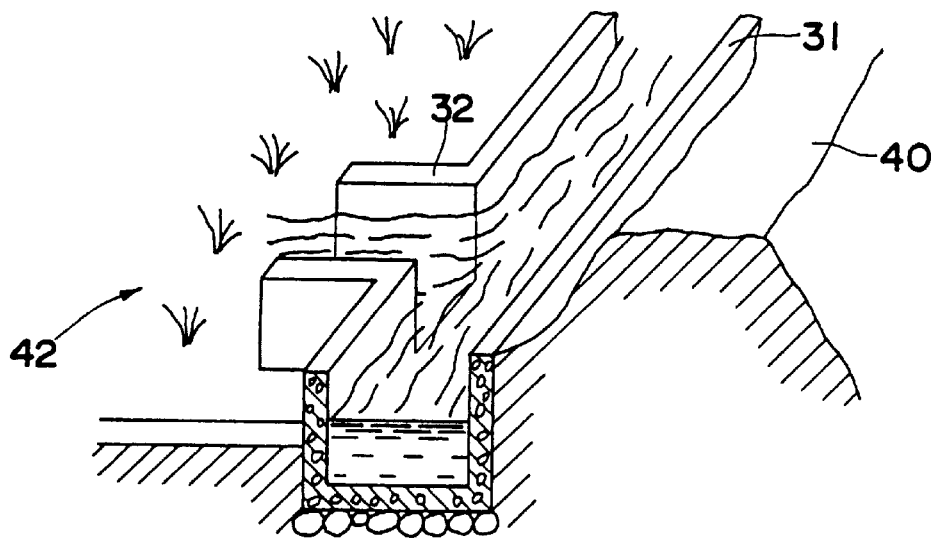
FIG. 32 is a perspective view of the conventional watering channel.

FIG. 26 is a schematic plan view showing an example of irrigation water control system employing water level regulating devices; FIG. 27 is a schematic illustration of piping showing the water level regulating device; FIG. 28 is a plan view; FIG. 29 is a cross-sectional front view; and FIG. 30 is a cross-sectional side view.

The water level regulating device 6 according to this embodiment is installed between a watering pipe 51 buried along a farm road 43 and each farming plot 42 to feed irrigation water supplied from the upstream side of the watering pipe 51 to the farming plots 42 and to drain the surplus irrigation water in the farming plots 42 to the downstream side of the watering pipe 51. Incidentally, the watering pipes 51 are connected via valves 51a to an upstream irrigation line 36 and via valves 51b to a downstream irrigation line 36 (the line locating at the downstream extremity serves as a drainage line).

This water level regulating device 6 contains a rectangular feed and drain basin 60 with a closed bottom, having a farming plot feed and drain port 61 communicating with the farming plot 42; a water inflow section 63a located in the basin 60 near the bottom thereof and connected to the upstream side of the watering pipe 51; a water outflow section 63b located in the basin 60 near the bottom thereof and connected to the downstream side of the watering pipe 51; a drain valve 64 located in the water outflow section 63b; and a height-adjustable open-top water level regulating weir 65 located in the water outflow section 63b. The farming plot feed and drain port 61 communicates via a height-adjustable check weir 67 with the farming plot 42.

The check weir 67 consists of a large-diameter cylinder 67P having an open upper end and an open lower end oriented perpendicular in the feed and drain basin 60; a branch cylinder 67T branching horizontally out of the large-diameter cylinder 67P at an upper position thereof and penetrating the wall of the feed and drain basin 60 to communicate with the farming plot 42; and a small-diameter cylinder 67Q fitted in the large-diameter cylinder 67P to be slidable vertically therein. A rubber seal packing 67R for providing water tightness and appropriate sliding resistance is interposed between the small-diameter cylinder 67Q and the large-diameter cylinder 67P at a position lower than the branching point of the branch cylinder 67T. The small-diameter cylinder 670 is designed to be moved vertically being guided by the seal packing 67R and to be retained at a desired height. This cylinder 670 has an operating rod 67H extending upward beyond the upper opening of the feed and drain basin 60.

Further, the branch cylinder 67T is opening down to a position lower than the field surface G, and the small-diameter cylinder 67Q is designed such that the upper edge thereof may be descended below the lower end of the branch cylinder 67T. Accordingly, if the ground in front of the branch cylinder 67T is dug down and the small-diameter cylinder 670 is pushed down or drawn out of the large-diameter cylinder 67P, drainage from the farming plot 42 can be accelerated.

The drain valve 64 and the water level regulating weir 65 have the same constitution as the counterparts in the second to fourth embodiments, respectively. Incidentally, the drain valve 64 is not normally operated to be open and closed, its operating rod 64H is located under a lid 60C covering the upper opening of the feed and drain basin 60.

The water level regulating devices 6 having the constitution described above are buried along the beveled faces of the farm roads 43 facing the farming plots 42 respectively, and the flooded water level L is set for each farming plot 42 by adjusting the height of the water level regulating weir 65.

Generally, in the water level regulating device 6 installed in each farming plot 42, the check weir 67 of the farming plot feed and drain port 61 is set such that the upper edge of the small-diameter cylinder 67Q may be located slightly lower than the flooded water level L, while the water level regulating weir 65 of the water outflow section 63b connected to the downstream side of the watering pipe 51 is set such that the upper edge of the cylinder 65T may be at the flooded water level L. Further, the drain valve 64 is closed fully, while a drain pipe 90 is closed.

Under this setting state, the irrigation water fed from the upstream side of the watering pipe 51 flows through the water inflow section 63a into the feed and drain basin 60. The irrigation water then flows through the lower opening of the large-diameter cylinder 67P of the check weir 67 to flow up therethrough and up through the small-diameter cylinder 67Q and over the upper edge thereof into the space defined between the large-diameter cylinder 67P and the small-diameter cylinder 67Q. The water is then supplied through the branch cylinder 67T to the farming plot 42. This feeding of irrigation water to the farming plot 42 is continued until the flooded water level L increases to reach a height exceeding the upper edge of the cylinder 65T of the water level regulating weir 65.

Meanwhile, the surplus irrigation water supplied to the farming plot 42 or rainwater flows back from the branch cylinder 67T through the route described above into the feed and drain basin 60 through the lower opening of the large-diameter cylinder 67P and then flows further over the upper edge of the cylinder 65T of the water level regulating weir 65 adjusted to the height corresponding to the flooded water level L and down through the pipe 65P and is drained through the water outflowflow section 63b into the downstream side of the watering pipe 51.

In this process, even if supply of irrigation water to the watering pipe 51 is stopped and the feed and drain basin 60 is empty, the irrigation water in the farming plot 42 does not flow back to the feed and drain basin 60, and a fixed flooded water level L can be maintained in the farming plot 42, since the upper edge of the small-diameter cylinder 67Q of the check weir 67 is set at a height substantially corresponding to the flooded water level L.

Accordingly, the flooded water level L in each farming plot 42 can be regulated automatically by adjusting the cylinder 65T of the water level regulating weir 65 to a predetermined height. Thus, a fixed flooded water level L can be maintained with a minimum necessary amount of irrigation water by suitably controlling supply of irrigation water to the watering pipes 51.

Since the amount of irrigation water to be supplied to each farming plot 42 can be reduced by carrying out control of irrigation water as described above, irrigation water can be distributed evenly throughout the farming plots 42 from the upstream side to the downstream side, avoiding lack of water from occurring in the downstream farming plots 42. Further, in the state where a fixed flooded water level L is maintained in each farming plot 42, the irrigation water in the farming plot 42 is not substantially drained to the outside, so that agricultural chemicals, fertilizers, etc. applied to the farming plot 42 scarcely flow out together with the irrigation water or rainwater, eliminating the fear of environmental disruption.

Meanwhile, when irrigation water is drained from the farming plot 42, the upstream feed valve 51a of the watering pipe 51 is closed, and the small-diameter cylinder 67Q of the check weir 67 is pushed down or drawn out of the large-diameter cylinder 67P, and also the cylinder 65T of the water level regulating weir 65 is pushed down or the drain valve 64 is opened. Thus, the irrigation water held in the farming plot 42 can be drained through the water outflow section 63b to the downstream side of the watering pipe 51. Likewise, the earth, sand, etc. carried from the farming plot 42 and the like through the branch cylinder 67T can be discharged together with the irrigation water by opening the drain valve 64.

Meanwhile, in puddling of paddy fields which requires a large amount of irrigation water at one time, the small-diameter cylinder 67Q of the check weir 67 is pushed down, while the cylinder 65T of the water level regulating weir 65 in the water outflow section 63b is pulled up. Thus, the irrigation water fed from the watering pipe 51 flows through the water inflow section 63a into the farming plot 42 and is entirely supplied into the farming plot 42 to be held therein without being discharged through the water outflow section 63b to reach quickly a predetermined water level. By repeating these procedures for each farming plot 42, irrigation water can be supplied throughout the farming plots from the upstream side to the downstream side successively.

Further, in the case where some farming plots 42 need not be irrigated due to cutback on rice acreage or other reasons, the small-diameter cylinders 67Q of the check weirs 67 in the farming plot feed and drain ports 61 of the water level regulating devices 6 of the relevant farming plots 42 are pulled up; whereas in the water outflow sections 63b thereof, the cylinders 65T of the water level regulating weirs 65 are pushed down or the drain valves 64 are opened fully. Thus, the irrigation water to be supplied from the upstream side of the watering pipe 51 flows through the feed and drain basin 60 to be drained into the downstream side of the watering pipe 51 without flowing into the farming plot 42.

Since the amount of irrigation water flowing through each watering pipe 51 can be reduced according to the water level regulating device 6 having the constitution as described above, a small-diameter pipe can be employed as the watering pipe 51. Further, since this water level regulating device 6 can be produced by suitably combining synthetic resin cylinders and the like and is integrated into the feed and drain basin 60, the water inflow section 63a and the water outflow section 63b may merely be connected via suitable joints to the watering pipe 51, leading to reduction in the installation cost etc. on a great margin.

Further, the presence of the check weir 67 enables prevention of earth, sand, etc. from being carried into the feed and drain basin 60 during puddling. Further, since the branch cylinder 67T is allowed to open down to a position lower than the field surface G, midseason drainage and drainage for changing crop production can be carried out effectively. That is, if the small-diameter cylinder 67Q is pulled up, earth, sand etc. are prevented from being carried into the feed and drain basin 60 during puddling. Further, in midseason drainage of paddy fields, the irrigation water can be drained by pushing down the small-diameter cylinder 67Q and digging down the ground around the branch cylinder 67T, and also the irrigation water in the paddy field can be drained smoothly to cope with cutback on rice acreage or changing crop production, advantageously.

Incidentally, the structure of the check weir may not be limited to the cylinder shown in the above embodiment but may be a bellows or a weir plate, and the valve structure may be selected suitably. Further, the operating rods may be designed to be removable employing, for example, a screwing structure, and thus the water level regulating weirs and the like are prevented from being operated unnecessarily.

What is claimed is:

1. A paddy field water level regulating device installed between a water pipe buried along a farm road and a farming plot, the device comprising:
    a cylindrical feed and drain basin with a closed bottom, having a farming plot feed and drain port communicating with the farming plot;
    a water inflow and drain section located in the feed and drain basin near the bottom thereof and connected to the water pipe;
    a drain valve located in the water inflow and drain section; and
    a height-adjustable water level regulating weir located in the water inflow and drain section.

2. The paddy field water level regulating device according to claim 1, wherein the farming plot feed and drain port communicates with the farming plot via a height-adjustable overflow gate.

3. The paddy field water level regulating device according to claim 1, wherein the water inflow and drain section is connected to the water pipe via a feed and drain valve.

4. The paddy field water level regulating device according to claim 1, wherein the water level regulating weir consists of a pipe having an upper end opening and connected to the water inflow and drain section and a cylinder fitted in the pipe to be movable vertically.

5. A paddy field water level regulating device installed between a group of pipes, including a watering pipe and a drain pipe which are buried along a farm road, and a farming plot, the device comprising:
a cylindrical feed and drain basin with a closed bottom, having a farming plot feed and drain port communicating with the farming plot;
a water inflow section located in the feed and drain basin near the bottom thereof and connected to the watering pipe;
a feed valve for controlling supply of irrigation water located in the water inflow section;
a height-adjustable check weir located in the water inflow section;
a water drain section located in the feed and drain basin near the bottom thereof and connected to the drain pipe;
a drain valve located in the water drain section; and
a height-adjustable water level regulating weir located in the water drain section.

6. The paddy field water level regulating device according to claim 5, wherein the farming plot feed and drain port communicates with the farming plot via a height-adjustable overflow gate.

7. The paddy field water level regulating device according to claim 5, wherein the check weir consists of a pipe having an upper end opening and connected to the water inflow section and a cylinder fitted in the pipe to be movable vertically.

8. The paddy field water level regulating device according to claim 5, wherein the water level regulating weir consists of a pipe having an upper end opening and connected to the water drain section and a cylinder fitted in the pipe to be movable vertically.

9. A paddy field water level regulating device installed between a group of pipes, including a watering pipe and a water level regulating pipe which are buried along a farm road, and a farming plot, the device comprising:
a cylindrical feed and drain basin with a closed bottom, having a farming plot feed and drain port communicating with the farming plot;
a water inflow section located in the feed and drain basin near the bottom thereof and connected to the watering pipe;
a feed valve for controlling supply of irrigation water located in the water inflow section;
a height-adjustable check weir located in the water inflow section;
a water level regulating basin connected to the water level regulating pipe;
a regulating water inflow section located in the water level regulating basin near the bottom thereof and connected to the upstream side of the water level regulating pipe;
a regulating water outflow section located in the water level regulating basin near the bottom thereof and connected to the downstream side of the water level regulating pipe;
a drain valve located in the regulating water outflow section;
a height-adjustable water level regulating weir located in the regulating water outflow section; and
a regulating water communicating section for allowing the feed and drain basin and the water level regulating basin to communicate with each other via regulating water blocking means.

10. The paddy field water level regulating device according to claim 9, wherein the farming plot feed and drain port communicates with the farming plot via a height-adjustable overflow gate.

11. The paddy field water level regulating device according to claim 9, wherein the check weir consists of a pipe having an upper end opening and connected to the water inflow section and a cylinder fitted in the pipe to be movable vertically.

12. The paddy field water level regulating device according to claim 9, wherein the water level regulating weir consists of a pipe having an upper end opening and connected to the water drain section and a cylinder fitted in the pipe to be movable vertically.

13. The paddy field water level regulating device according to claim 9, wherein the feed and drain basin and the water level regulating basin are juxtaposed integrally via a partition containing the regulating water communicating section.

14. A paddy field water level regulating device installed between a group of pipes, including a watering pipe, a drain pipe and a water level regulating pipe which are buried along a farm road, and a farming plot, the device comprising:
a cylindrical feed and drain basin with a closed bottom, having a farming plot feed and drain port communicating with the farming plot;
a water inflow section located in the feed and drain basin near the bottom thereof and connected to the watering pipe;
a feed valve for controlling supply of irrigation water located in the water inflow section;
a water drain section located in the feed and drain basin near the bottom thereof and connected to the drain pipe;
a drain valve located in the water drain section;
a height-adjustable drainage regulating weir located in the water drain section;
a water level regulating basin connected to the water level regulating pipe;
a regulating water inflow section located in the water level regulating basin near the bottom thereof and connected to the upstream side of the water level regulating pipe;
a regulating water outflow section located in the water level regulating basin near the bottom thereof and connected to the downstream side of the water level regulating pipe;
a height-adjustable water level regulating weir located in the regulating water outflow section; and
a regulating water communicating section for allowing the feed and drain basin and the water level regulating basin to communicate with each other via regulating water blocking means.

15. The paddy field water level regulating device according to claim 14, wherein the feed and drain basin is provided with a drain pipe opening down into the ground under the farming plot via blocking means which can be opened and closed.

16. The paddy field water level regulating device according to claim 14, wherein the farming plot feed and drain port communicates with the farming plot via a height-adjustable overflow gate.

17. The paddy field water level regulating device according to claim 14, wherein the water inflow section is provided with a height-adjustable check weir.

18. The paddy field water level regulating device according to claim 17, wherein the check weir consists of a pipe having an upper end opening and connected to the water inflow section and a cylinder fitted in the pipe to be movable vertically.

19. The water level regulating device according to claim 14, wherein the drainage regulating weir consists of a pipe having an upper end opening and connected to the water drain section and a cylinder fitted in the pipe to be movable vertically.

20. The water level regulating device according to claim 14, wherein the water level regulating weir consists of a pipe having an upper end opening and connected to the regulating water outflow section and a cylinder fitted in the pipe to be movable vertically.

21. The paddy field water level regulating device according to claim 14, wherein the feed and drain basin and the water level regulating basin are juxtaposed integrally via a partition containing the regulating water communicating section.

22. A paddy field water level regulating device installed between a watering pipe buried along a farm road and a farming plot, the device comprising:
   a cylindrical feed and drain basin with a closed bottom, having a farming plot feed and drain port communicating with the farming plot;
   a water inflow section located in the feed and drain basin near the bottom thereof and connected to the upstream side of the watering pipe;
   a water outflow section located in the feed and drain basin near the bottom thereof and connected to the downstream side of the watering pipe;
   a drain valve located in the water outflow section; and
   a height-adjustable water level regulating weir located in the water outflow section.

23. The paddy field water level regulating device according to claim 22, wherein the farming plot feed and drain port communicates with the farming plot via a height-adjustable check weir.

24. The paddy field water level regulating device according to claim 23, wherein the check weir consists of a large-diameter cylinder having an upper end opening and a lower end opening, a branch cylinder branching horizontally out of the large-diameter cylinder and penetrating the wall of the feed and drain basin to communicate with the farming plot, and a small-diameter cylinder fitted in the large-diameter cylinder to be slidable vertically.

25. The water level regulating device according to claim 22, wherein the water level regulating weir consists of a pipe having an upper end opening and connected to the regulating water outflow section and a cylinder fitted in the pipe to be movable vertically.

* * * * *